(12) United States Patent
Ying

(10) Patent No.: US 8,645,582 B2
(45) Date of Patent: *Feb. 4, 2014

(54) NETWORK NODE WITH PLUG-IN IDENTIFICATION MODULE

(75) Inventor: Jeffrey Ying, Glendora, CA (US)

(73) Assignee: I/O Controls Corporation, Azusa, CA (US)

( * ) Notice: Subject to any disclaimer, the term of this patent is extended or adjusted under 35 U.S.C. 154(b) by 1926 days.

This patent is subject to a terminal disclaimer.

(21) Appl. No.: 11/531,405

(22) Filed: Sep. 13, 2006

(65) Prior Publication Data

US 2007/0115808 A1 May 24, 2007

Related U.S. Application Data

(63) Continuation-in-part of application No. 10/838,650, filed on May 3, 2004, now abandoned, which is a continuation of application No. 09/442,369, filed on Nov. 17, 1999, now Pat. No. 6,732,202.

(51) Int. Cl.
*G06F 3/00* (2006.01)

(52) U.S. Cl.
USPC .................................................................. 710/8

(58) Field of Classification Search
None
See application file for complete search history.

(56) References Cited

U.S. PATENT DOCUMENTS

| | | | |
|---|---|---|---|
| 3,890,471 A | 6/1975 | Hachenburg | 179/15 |
| 4,251,858 A | 2/1981 | Cambigue et al. | 364/132 |
| 4,435,704 A | 3/1984 | Hashimoto et al. | 370/223 |
| RE31,852 E | 3/1985 | Soderblom | 370/86 |
| 4,527,270 A | 7/1985 | Sweeton | 370/224 |
| 4,579,407 A | 4/1986 | Shimada | 339/29 |
| 4,610,013 A | 9/1986 | Long et al. | 395/182.09 |
| 4,634,110 A | 1/1987 | Julich et al. | 364/131 |
| 4,812,943 A | 3/1989 | Jones et al. | 361/95 |
| 4,814,984 A | 3/1989 | Thompson | 395/200.39 |
| 4,973,953 A | 11/1990 | Shimokawa et al. | 370/223 |
| 5,003,579 A | 3/1991 | Jones | 379/93 |
| 5,117,430 A | 5/1992 | Berglund | 340/825.02 |
| 5,177,478 A | 1/1993 | Wagai et al. | 340/825.44 |
| 5,423,024 A | 6/1995 | Cheung | 395/182.09 |
| 5,455,959 A | 10/1995 | Simmering | 364/132 |
| 5,461,608 A | 10/1995 | Yoshiyama | 395/183.19 |
| 5,465,082 A * | 11/1995 | Chaco | 340/825.49 |
| 5,583,754 A | 12/1996 | Leonhardt et al. | 364/132 |

(Continued)

FOREIGN PATENT DOCUMENTS

JP 10-326259 12/1998
JP 10-333930 12/1998

*Primary Examiner* — Henry Tsai
*Assistant Examiner* — Aurangzeb Hassan
(74) *Attorney, Agent, or Firm* — Irell & Manella LLP

(57) ABSTRACT

A network node well suited for use in a distributed control network includes a housing containing the node electronics, and an external port for receiving a detachable plug-in module. The plug-in module contains a programmable memory which, when the plug-in module is attached, allows electronic interconnection between the electronics of the network node and the readable memory. The readable memory stores a unique node identifier which becomes associated with the node, and can also store functional program code for the particular node. Thus, a node can be easily and rapidly replaced or reprogrammed, without the need for specialized equipment to download the node identifier or functional program code, and without the possibility of erroneous manual entry of the node identifier. The plug-in module further includes a writable memory portion which can be used to store data during operation of the node, for later retrieval.

39 Claims, 16 Drawing Sheets

(56) References Cited

U.S. PATENT DOCUMENTS

| | | | |
|---|---|---|---|
| 5,623,637 A | 4/1997 | Jones et al. | 711/64 |
| 5,751,220 A | 5/1998 | Ghaffari | 340/825.21 |
| 5,802,043 A | 9/1998 | Skillen et al. | 370/258 |
| 5,809,220 A | 9/1998 | Morrison et al. | 395/185.08 |
| 5,884,091 A | 3/1999 | Ghori et al. | 395/800.32 |
| 5,907,486 A | 5/1999 | Ying | 700/3 |
| 6,340,588 B1 * | 1/2002 | Nova et al. | 506/16 |
| 6,438,686 B1 | 8/2002 | Daughtry et al. | 713/1 |
| 6,516,373 B1 | 2/2003 | Talbot et al. | 710/301 |
| 6,651,877 B2 * | 11/2003 | Fukuda et al. | 235/375 |
| 6,732,202 B1 | 5/2004 | Ying | 710/62 |

* cited by examiner

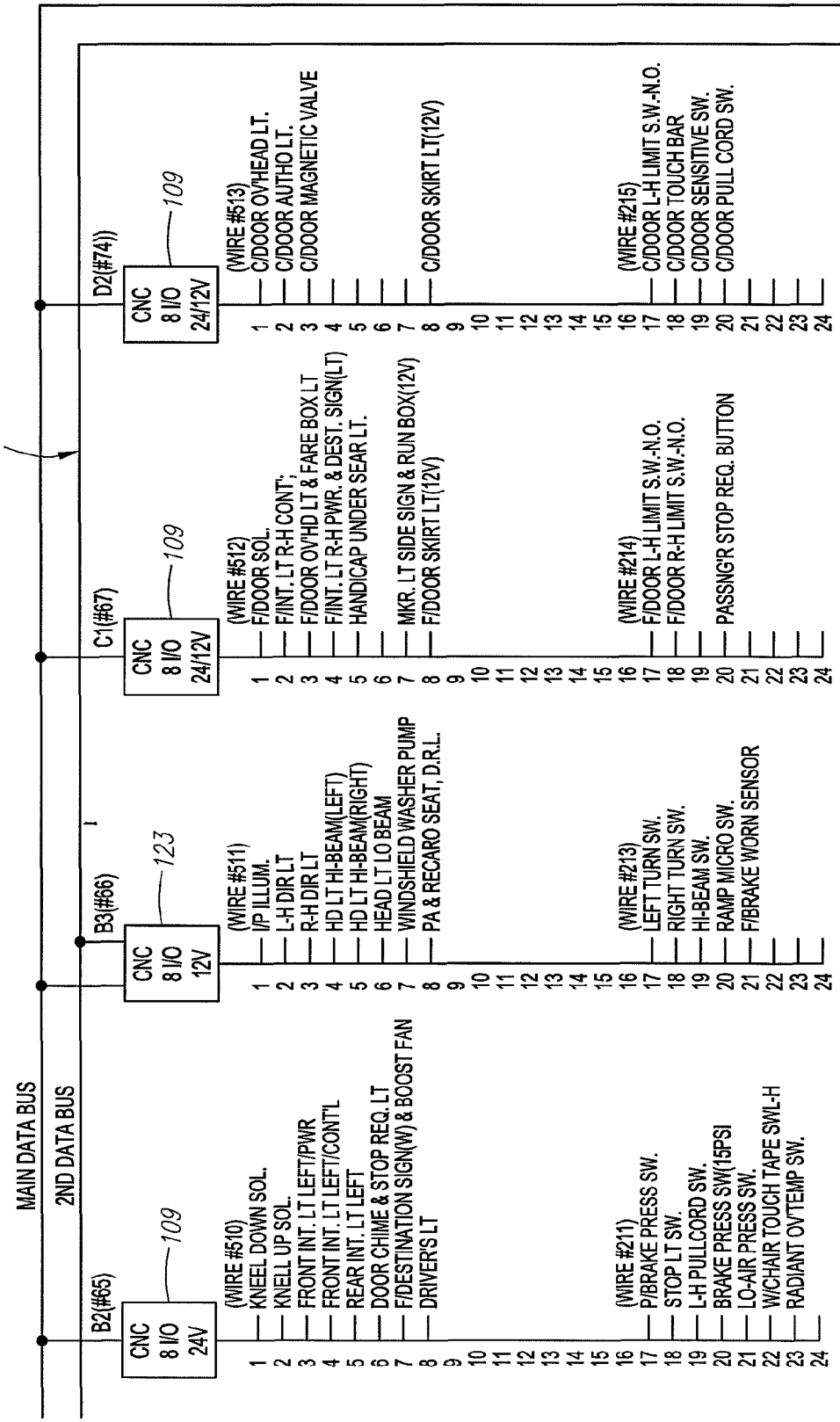

NETWORK NODE WITH PLUG-IN IDENTIFICATION MODULE

RELATED APPLICATION INFORMATION

This application is a continuation-in-part of U.S. application Ser. No. 10/838,650, filed on May 3, 2004, now abandoned which is a continuation of U.S. application Ser. No. 09/442,369, filed on Nov. 17, 1999, now U.S. Pat. No. 6,732,202, hereby incorporated by reference as if set forth fully herein.

BACKGROUND OF THE INVENTION

1) Field of the Invention

The field of the invention pertains to methods and apparatus for implementing a control network and, more particularly, to a network node for use in a control network.

2) Background

Automated control systems are commonly used in a number of manufacturing, transportation, and other applications, and are particularly useful to control machinery, sensors, electronics, and other system components. For example, manufacturing or vehicular systems may be outfitted with a variety of sensors and automated electrical and/or mechanical parts that require enablement or activation when needed to perform their predefined functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery have grown in number and complexity, a need has arisen for ways to exercise control over the various components of a system rapidly, efficiently and reliably. The sheer number of system components to be monitored, enabled, disabled, activated, deactivated, adjusted or otherwise controlled can lead to difficulties in designing and implementing a suitable control system. As the number of system components to be controlled is increased, not only is the operation of the control system made more complicated, but also the wiring and inter-connections of the control system are likewise more elaborate. In addition, greater reliance on automated control has resulted in larger potential consequences if the automated control system fails.

Certain conventional types of distributed control network use a hierarchical control structure with nodes to handle local tasks. For example, one type of control network uses a dual-bus architecture including a primary bus for a high-speed, bi-directional communication link interconnecting a main (or first-tier) data bus controller with distributed slave nodes. One of the slave nodes acts as a second-tier data bus controller connected to a secondary, low-speed data bus. A number of second-tier slave nodes may be connected to the secondary data bus. The first-tier and second-tier slave nodes may be connected to various input/output ports for performing various local functions. The main data bus controller, secondary data bus controller, first-tier slave nodes, second-tier slave nodes, input/output ports and other system components collectively form a hierarchical system wherein the main data bus controller supervises the first-tier slave nodes, including the second data bus controller, the second data bus controller supervises the second-tier slave nodes, and the first-tier slave nodes and second-tier slave nodes supervise their assigned input/output functions.

A more elaborate control network system as conventionally known is described, for example, in U.S. Pat. No. 5,907,486, assigned to the assignee of the present invention. In the system described therein, additional data buses may be added to the hierarchical control network, so as to form additional second-tier control loops each having a secondary data bus controller (master node) and a set of second-tier slave nodes, and/or additional lower-tier control loops, each having an Nth-tier data bus controller (master node) and a set of Nth-tier slave nodes.

A problem that particularly affects large, distributed control networks is re-configuring the system when network nodes are replaced or added. A network node may be replaced because it has failed electrically, or because additional functionality is needed, or may be added to increase the capability or size of the control network. Each network node requires a unique identifier, so it can be referenced by the other nodes. Each network node is also required to be programmed with its specific functionality. As currently practiced, when network nodes are replaced, a computer or special tool is needed to download the node identifier and/or functional program code to the node. This task requires specialized equipment, and is time-consuming and inconvenient. Moreover, a mistake can be made in entering the node identifier manually, which will cause the system to function improperly thereafter.

Likewise, when an existing network node needs to be reprogrammed to change its functionality, the same sort of specialized equipment is needed to download the new program or change the program parameters. Again, this task is time-consuming and inconvenient.

Accordingly, it would be advantageous to provide a mechanism for allowing rapid and convenient association of a network node with a node identifier, and rapid and convenient programming of a newly added or existing network node.

SUMMARY OF THE INVENTION

According to one aspect of the invention, a network node for use in a control network is provided, in which association of a node identifier and/or functional program code with the node is carried out in a rapid and convenient manner, without the need for specialized equipment, and without the possibility of erroneous manual entry of the node identifier.

In one embodiment, a network node includes a housing in which the electronics of the network node are contained, including one or more processors and various I/O functions. The housing includes a port to which a plug-in module can be physically attached. The plug-in module contains a readable memory which, when the plug-in module is attached to the node housing, allows electronic interconnection between the electronics of the network node and the readable memory. The readable memory stores a unique node identifier which becomes associated with the node, as well as, if desired, the functional program code for the particular node. In operation, the node reads in its node identifier from the appropriate address of the readable memory, and thereafter sends and receives communications in accordance with the node identifier it has read out from the plug-in module.

In another embodiment, the plug-in module further includes a writable memory portion which can be used, for example, to store data during operation of the node, for later retrieval. The writable memory portion may be configured to store data from sensors, instruments, switches, and so forth, and/or control data or internal parameters or settings, and may store such data at periodical intervals or in response to a triggered event or alarm situation.

In certain embodiments, the plug-in module may take the form of an enclosed cylindrical unit having wrapped about its periphery at one end a cylindrical attachment piece with inner threading. The node housing may have a short, cylindrically-shaped extension with outer threading for receiving the cylindrical attachment piece. The cylindrical attachment piece may be screwed onto the cylindrically-shaped extension to secure the plug-in module to the node housing. When the plug-in module is secure, pins along the base of the plug-in module fit snugly into opposing holes along the top of the extension piece on the node housing (or vice versa).

The network node configurations are described with reference to a preferred multi-bus hierarchical control network, which includes a first-tier common bus and a plurality of lower-tier common buses. A first-tier master node controls a plurality of first-tier slave nodes using the first-tier common bus for communication. Each of the first-tier slave nodes may be connected to a separate second-tier common bus, and each operates as a respective second-tier master node for a plurality of second-tier slave nodes connected to the particular second-tier common bus associated with the first-tier slave/second-tier master node. Likewise, each of the second-tier slave nodes may be connected to a separate third-tier common bus, and each would then operate as a respective third-tier master node for a plurality of third-tier slave nodes connected to the particular third-tier common bus associated with the second-tier slave/third-tier master node. A preferred node comprises two separate transceivers, an uplink transceiver for receiving control information, and a downlink transceiver for sending out control information. Each node therefore has the capability of performing either in a master mode or a slave mode, or in both modes simultaneously.

Further variations and embodiments are also disclosed herein, and are described hereinafter and/or depicted in the figures.

DETAILED DESCRIPTION OF THE PREFERRED EMBODIMENT(S)

Figure 1A:
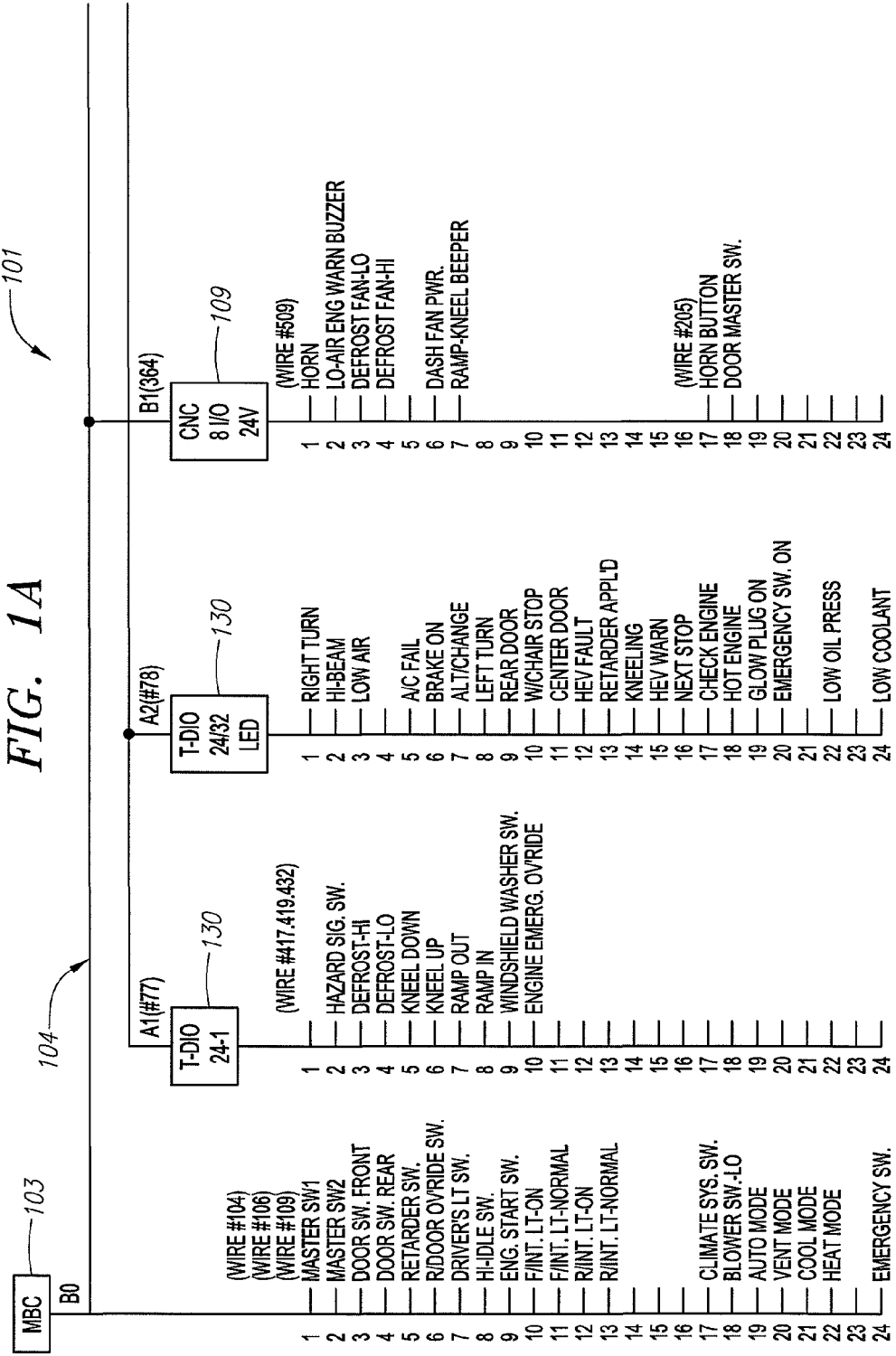
FIG. 1 is a diagram of a distributed control network with two data buses as known in the prior art.

This application is generally related to U.S. Pat. No. 5,907,486 entitled "Wiring Method and Apparatus for Distributed Control Network," U.S. Pat. No. 6,061,600 entitled "Backup Control Mechanism in a Distributed Control Network," U.S. Pat. No. 6,147,967 entitled "Fault Isolation and Recovery In A Distributed Control Network," and U.S. Pat. No. 6,094,416 entitled "Multi-Tier Architecture for Control Network," all of which foregoing are hereby incorporated by reference as if set forth fully herein.

In one aspect, a control network includes a plurality of reconfigurable network nodes which can be correlated with specific node identification information after deployment using a plug-in module which can be physically attached to the outer housing of the node. An exemplary network node in this environment includes a housing in which the electronics of the network node are contained, including one or more processors and various I/O functions. The housing includes a port to which the plug-in module can be physically attached. The plug-in module may comprise a detachable external member which can be readily secured to and detached from the housing. The plug-in module may contain a programmable external memory which, when the plug-in module is attached to the node housing, allows electronic interconnection between the electronics of the network node and the programmable memory. The programmable memory stores a unique node identifier which becomes associated with the node, as well as, if desired, the functional program code for the particular node. In operation, the node reads in its node identifier from the appropriate address of the programmable memory, and thereafter sends and receives communications in accordance with the node identifier it has read out from the plug-in module.

In certain embodiments, a portion of the programmable memory of the plug-in module is configured for storing data during operation of the node, for later retrieval. This portion of the memory may, for example, be configured to store data from sensors, instruments, switches, and so forth, and/or control data or internal parameters or settings, and may store such data at periodical intervals or in response to a triggered event or alarm situation.

The network node may be employed in a multi-bus hierarchical control network, which includes a first-tier common bus and a plurality of lower-tier common buses. In such a network, a first-tier master node may control a plurality of first-tier slave nodes using the first-tier common bus for communication. Each of the first-tier slave nodes may be connected to a separate second-tier common bus, and each operates as a respective second-tier master node for a plurality of second-tier slave nodes connected to the particular second-tier common bus associated with the first-tier slave/second-tier master node. Likewise, each of the second-tier slave nodes may operate as a third-tier master node for a plurality of third-tier slave nodes connected to a third-tier bus. A preferred node comprises two separate transceivers, an uplink transceiver for receiving control information, and a downlink transceiver for sending out control information. Each node therefore has the capability of performing either in a master mode or a slave mode, or in both modes simultaneously. Details of a preferred multi-bus hierarchical control network will first be described, followed by details of a preferred network node.

Figure 1C:
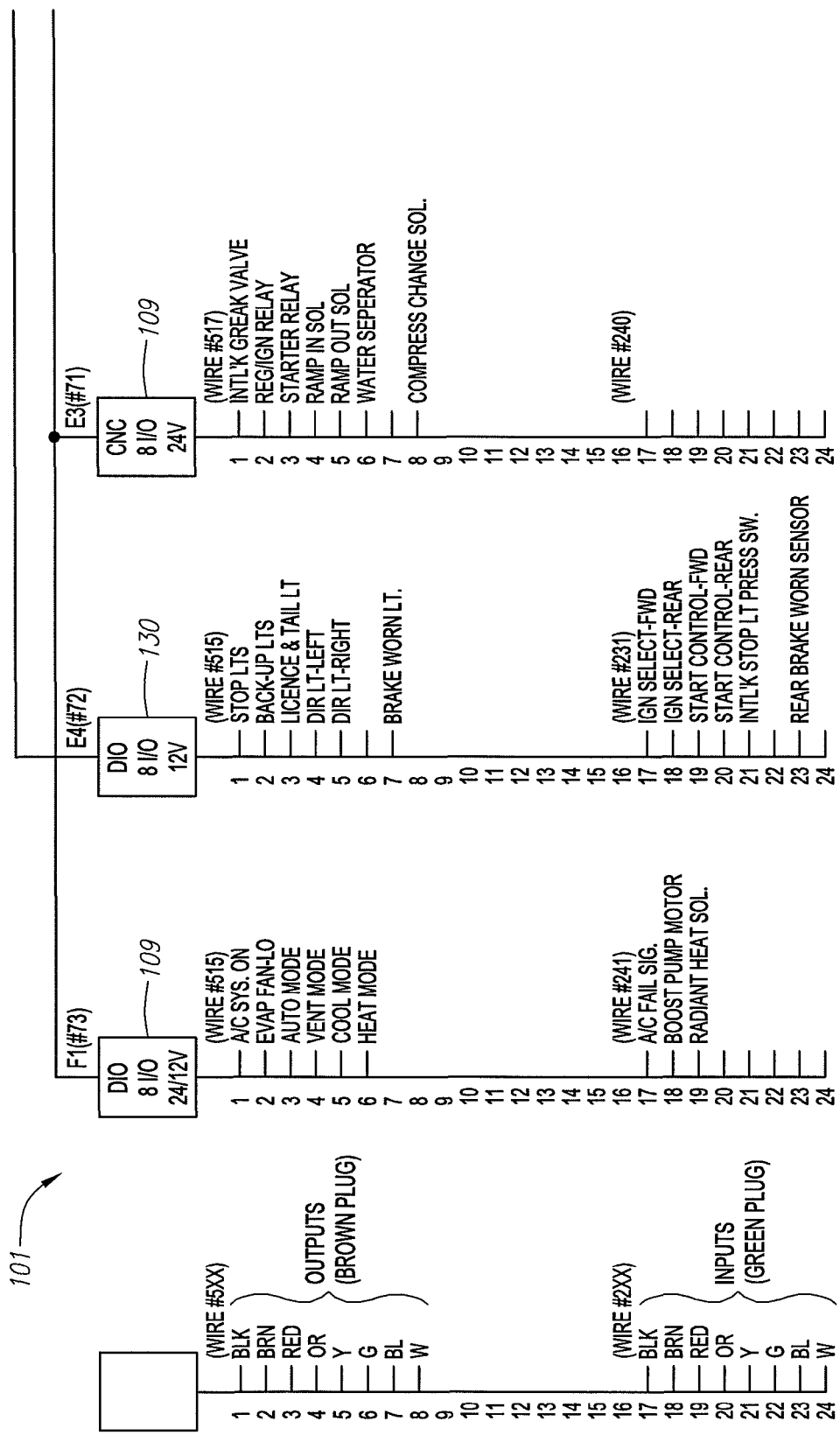
Figure 1D:
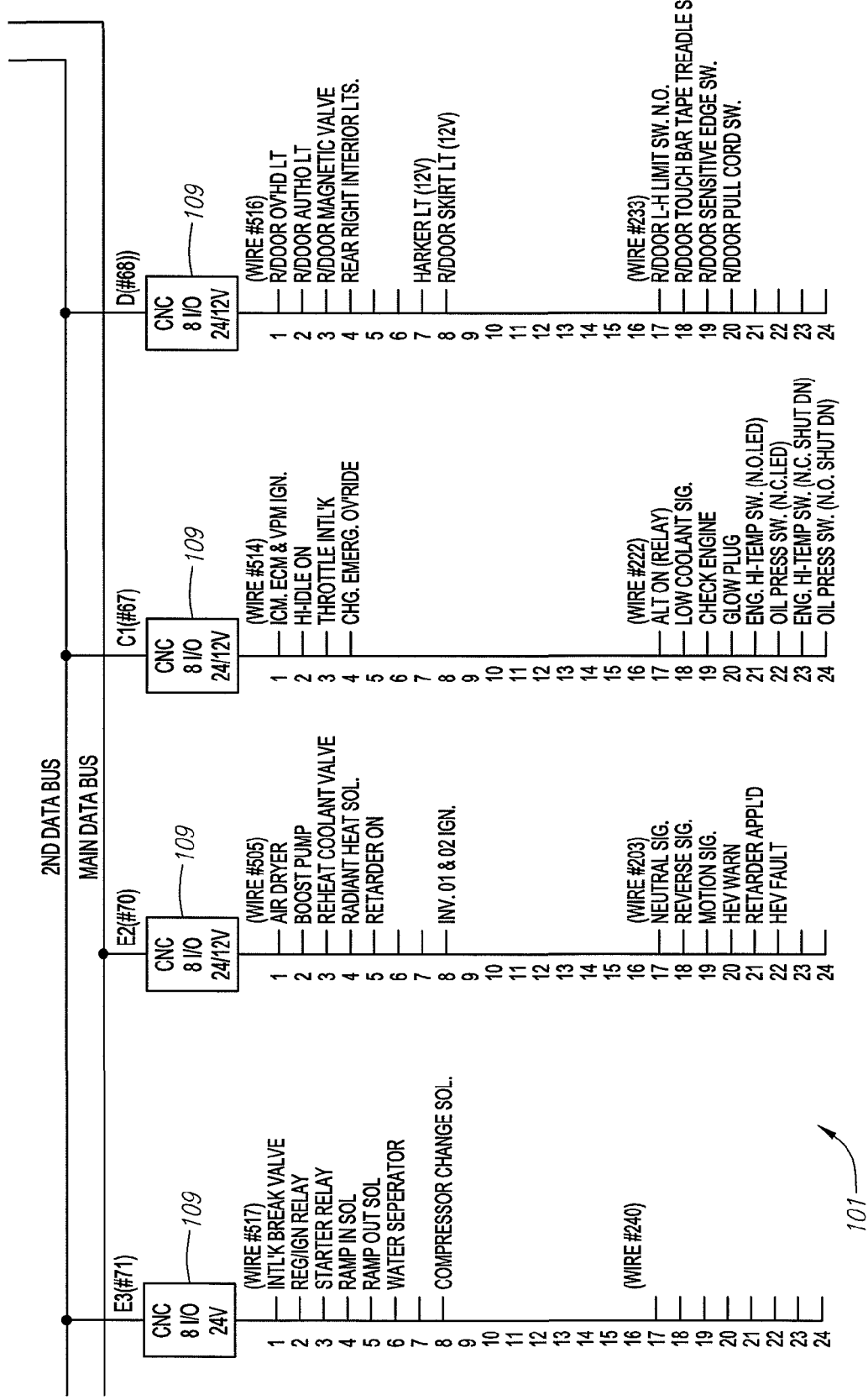

FIG. 1 is a block diagram showing the interconnection of nodes in a particular type of control network 101 as known in the art. The control network 101 comprises a main data bus controller 103 which is connected over a main data bus 104 to a plurality of first-tier slave nodes 109 and 123. One first-tier slave node 123 connected to the main data bus 104 also functions as a second data bus controller, and is connected to a second data bus 113. The second data bus controller 123 is connected over the second data bus 113 to a plurality of second-tier slave nodes 130. The main data bus 104 forms a high-speed, bi-directional communication link between the main data bus controller 103 and the first-tier slave nodes 109 and 123, and the second data bus 113 forms a low-speed, bi-directional communication link between the second data bus controller 123 and the second-tier slave nodes 130.

The nature of the slave nodes 109, 123 and 130 depends in part on the control application for which they are deployed. In a transit vehicle or railcar, for example, the master data bus controller 103 and the slave nodes 109, 123 and 130 may each be assigned to control a particular section of the vehicle or railcar, or may be assigned to control particular input and output functions. For each slave node 109, 123 and 130 in FIG. 1, various control signals are shown connected to the nodes such as to illustrate one exemplary arrangement of control functionality.

In operation, the main controller 103 communicates with the first-tier slave nodes 109 and 123 using the main data bus 104 as a high speed bi-direction link. An exemplary baud rate for communications over the main data bus 104 is 256 k. The main data bus controller 103 is generally responsible for delegating control commands to the first-tier slave nodes 109 and 123, and for responding to status information and events communicated to the main data bus controller 103 over the main data bus 104. Each of the first-tier slave nodes 109 and 123 receives commands from the main data bus controller 103, and issues appropriate commands over their respective control lines. In a similar manner, the second data bus controller 123 communicates with the second-tier slave nodes 130 using the second data bus 113 as a low speed bi-direction link (having a baud rate of, e.g., 9.6 k), and instructs the second-tier slave nodes 130 to carry out certain control functions, or responds to status messages or events relayed to the second data bus controller 123 from the second-tier slave nodes 130.

Figure 2:
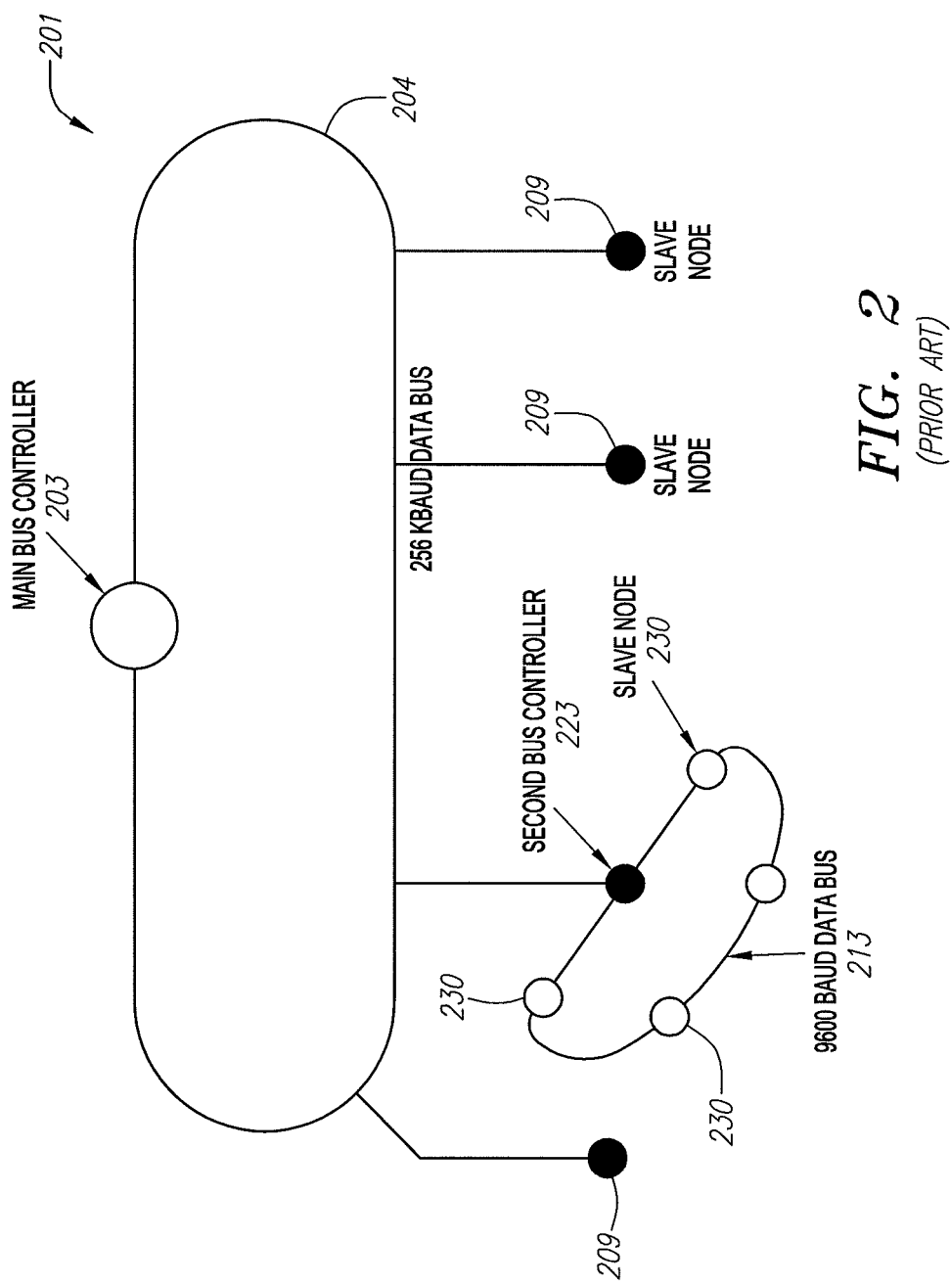
FIG. 2 is another diagram of a distributed control network having a two data buses each configured in a loop configuration as known in the prior art.

FIG. 2 is a diagram showing the layout or architecture of the FIG. 1 control network. The control network 201 shown in FIG. 2 comprises a main data bus controller 203 which is connected to a main data bus 204. The main data bus 204 is physically connected to a plurality of first-tier slave nodes 209 and 223. As explained with respect to the control network 101 shown in the FIG. 1, one of the first-tier slave nodes 223 also functions as a second data bus controller 223, and is connected over a second data bus 213 to a plurality of second-tier slave nodes 230. The main data bus 204 is configured in a loop such that it passes through each of the first-tier slave nodes 209 and 230 and returns to rejoin the main data bus controller 203. In this way, should the wires of the main bus 204 become severed, the main data bus controller 203 will still be connected to the first-tier slave nodes 209 and 223 and will not necessarily lose control over the system. Similarly, the second data bus 213 is configured in a loop such that it passes through each of the second-tier slave nodes 230 and returns to rejoin the second data bus controller 223, thereby providing an architecture resilient to potential severing of the wires of the second data bus 113. Each of the main data bus controller 203, first-tier slave nodes 209 and 223, and second-tier slave nodes 230 may be connected to a plurality of control signals for performing control or sensor functions, or various other input and output functions as necessary for the particular control application.

The control network 201 shown in FIG. 2 thus utilizes a dual-bus architecture to perform control functions. Because of the hierarchical architecture of the control system 201, relatively low baud rates on the second data bus 213 can be tolerated, leading to reduced system size, cost and complexity over traditional non-hierarchical, relay-based systems. The slower speed on the secondary data bus 213 also reduces the system's susceptibility to electromagnetic interference, a potential problem in certain control system environments (such as railcars).

Figure 3:
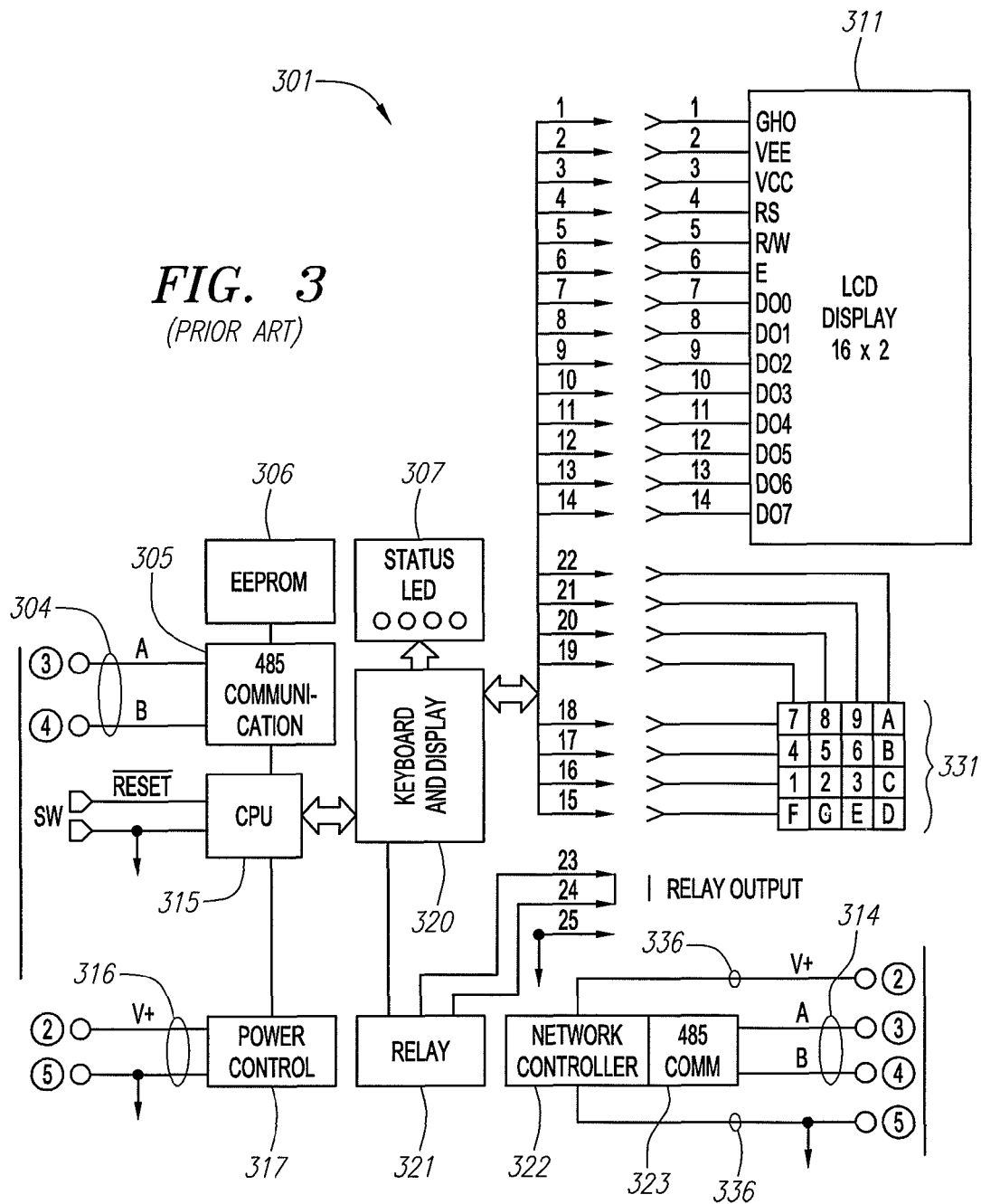
FIG. 3 is a circuit block diagram of a node that may be employed in the distributed control network of FIG. 1 or FIG. 2.

Each node, whether master data bus controller 203, first-tier slave node 209 or 223, or second-tier slave node 230, includes means for performing computations necessary for its functionality, and is configured with components such as a central processing unit (CPU) and memory. FIG. 3 is a more detailed block diagram of an example of a node 301 (such as the master data bus controller 203, a first-tier slave node 209 or 223, or a second-tier slave node 230) that may be employed in the control network of FIG. 2. The node 301 in this example comprises a CPU 315 connected to a power control block 317 and a transceiver 305. The node 301 is also connected to power signal lines 316, which connect to the power control block 317. The node 301 may communicate over communication signal lines 304, which are connected to the transceiver 305. A memory such as an electrical erasable programmable read-only memory (EEPROM) 306 stores programming information utilized by the CPU 315 for carrying out certain programmable functions. The CPU 315 has access to a random access memory (RAM) (not shown) and read-only memory (ROM) (not shown) as needed for the particular application.

The CPU 315 in this example is connected to a keyboard/display interface block 320. The keyboard/display interface block 320 is connected to status LEDs 307, relays 321, and LED display 311 and a keypad 331. The node 301 thereby can accept manual inputs (e.g., from the keypad 331) or receive sensor inputs (e.g., over relays 321), and can display operational status using status LEDs 301 or LCD display 311.

The node 301 further may comprise a network controller 322 which preferably comprises a second CPU. The network controller 322 in this example is connected to a second transceiver 323 which is connected to a second pair of communication signal lines 314. The network controller also outputs power signal lines 336.

In operation, node 301 may communicate over two different data buses using transceivers 305 and 323. Thus, node 301 may communicate over a first data bus (such as data bus 204 shown in FIG. 1) by receiving and transmitting signals over communication signal lines 314 using transceiver 323, under control of the network controller 322. The node 301 may communicate over a second data bus (such as data bus 213 shown in FIG. 2) by transmitting and receiving signals over communication signal lines 304 using transceiver 305, under control of CPU 315. The CPU 315 and network controller 322 may transfer information back and forth using a shared memory (not shown). The node 301 may serve as both a "slave" unit with respect to the first data bus 204 and a "master" unit with respect to the second data bus 213. By interconnecting a plurality of nodes 301 in an appropriate configuration, a hierarchical control network with two data buses (as shown in FIG. 2) may be established.

Figure 4:
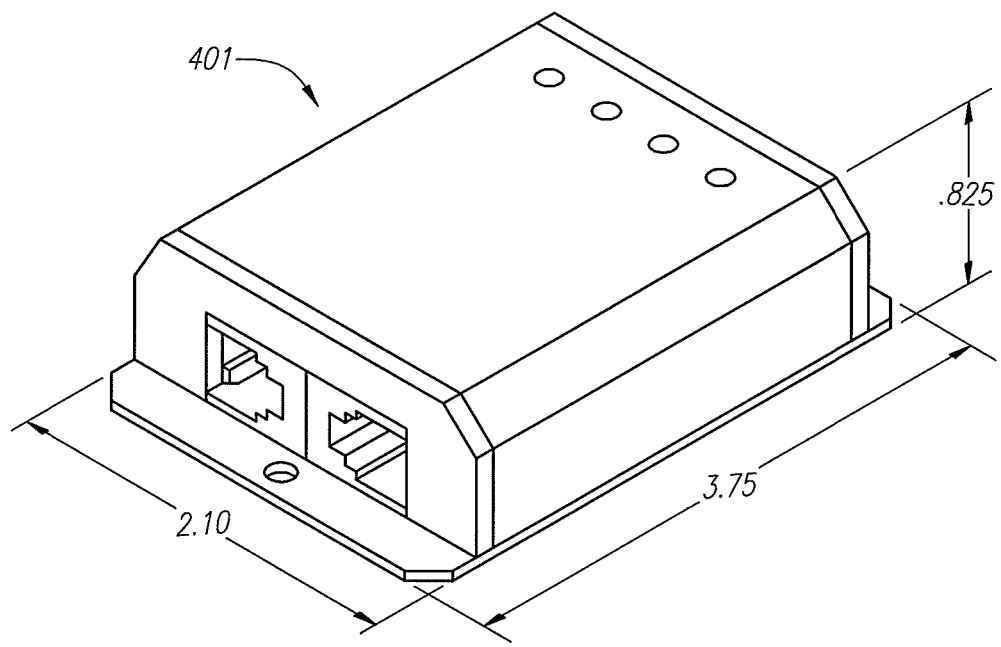
FIG. 4 is a diagram showing a physical encasement of the node shown in FIG. 3.

Each node 301 such as shown in FIG. 3 is housed in a rugged, potted case made of a suitable lightweight material such as aluminum that provides environmental protection and allows for heat dissipation. FIG. 4 is a diagram showing an exemplary physical casing 401 of a module or node 301 such as shown in FIG. 3. The casing 401 can be quite small; in the example of FIG. 4, the casing 401 measures approximately 2.1" by 3.75", and is 0.825" in thickness.

A problem that can occur in operation of a control network such as shown in FIG. 2 is that if the master data bus controller 203 fails then operation of the entire system could be jeopardized. A possible solution would be to provide a redundant master data bus controller that has the same functionality as the primary master data bus controller 203 in all respects. Upon detecting a failure of the primary master data bus controller 203, the backup master data bus controller could shut down the primary master data bus controller 203 and take over control of the network.

While having such a separate, redundant master data bus controller for backup purposes may provide a solution where the primary master data bus controller 203 fails, it falls short of being a complete solution. As an entirely separate controller having complete functional and hardware redundancy of the primary master data bus controller 203, incorporation of the backup master data bus controller effectively doubles the cost of implementing the master data bus controller 203. Also, another drawback is that if both the master data bus controller 203 the backup master data bus controller fail, then operation of the entire system would be jeopardized and operation could come to complete halt.

In addition to the possibility of the master data bus controller 203 failing, the second data bus controller 223 could also be subject to failure. While a redundant second data bus controller for backup purposes could be provided, the cost of implementing the second data bus controller would be essentially doubled, and the system is still subject to potentially complete failure should the second data bus controller also fail. Moreover, adding redundant data bus controllers could complicate the wiring of the system.

To avoid such complications, redundant backup control may be provided as described below for the master data bus controller 203 or other type of master node, the second data bus controller 223 or similar types of nodes, and, if further nested control levels exist (as described, for example, in later embodiments herein), other sub-controllers for those control levels.

Figure 5:
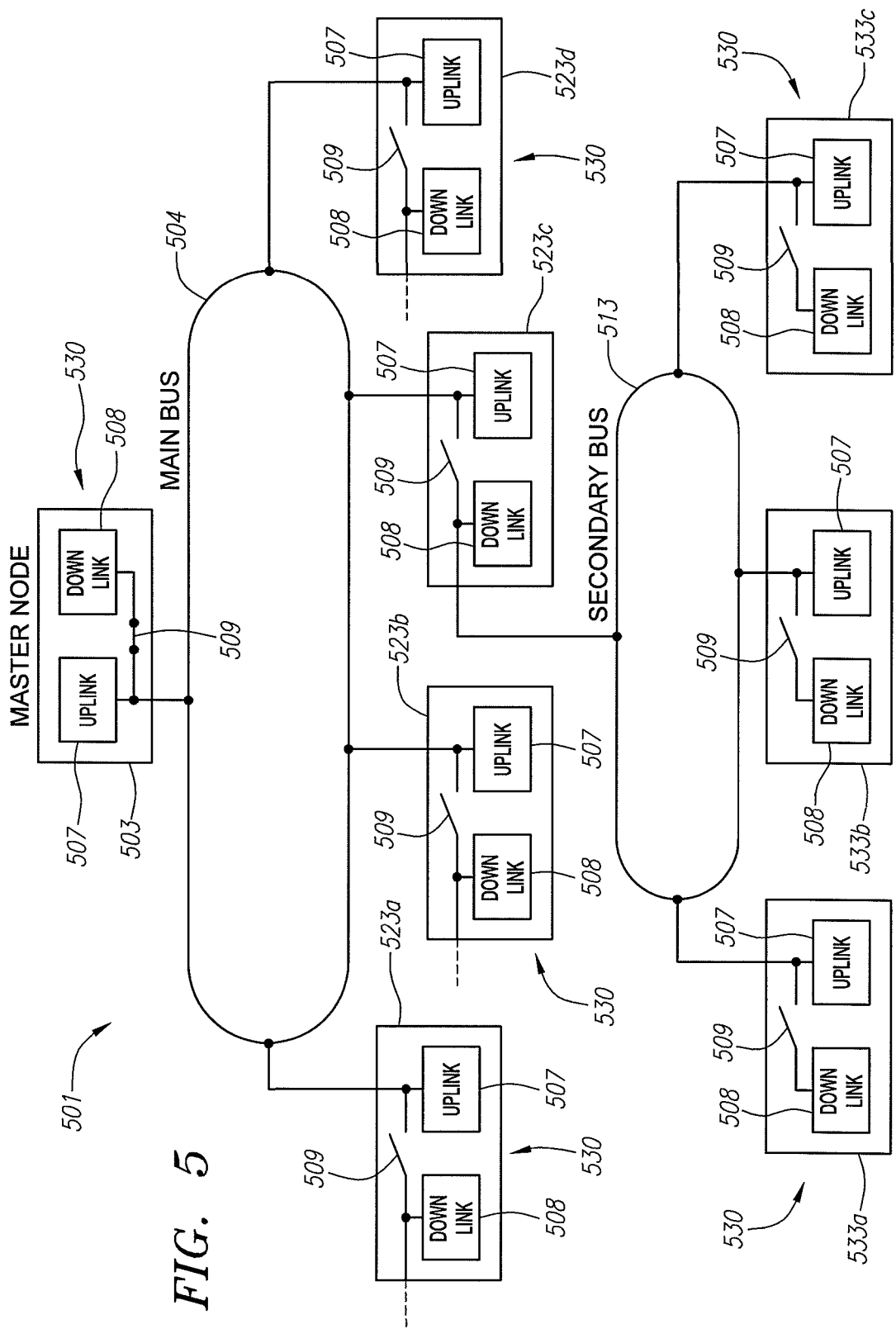
FIG. 5 is a block diagram of a preferred control network architecture in accordance with one or more aspects of the present invention.

FIG. 5 is a block diagram of a preferred embodiment of a control network 501 having redundant backup control capability for a master node at each bus level of the control network 501. In the context of this discussion, the node acting as the master bus controller for a particular bus will be referred to as the "master node" for that particular bus, and all the other nodes on that bus will be referred to as "slave nodes" for that particular bus. In the control network shown in FIG. 5, a master node 503 and a plurality of first-tier slave nodes 523 are connected to a main data bus 504. In a preferred embodiment of the invention, each of the slave nodes 523 is configured or can be configured to control a secondary data bus. For example, the first-tier slave node 523c is shown connected to a secondary data bus 523 in the control network 501. The first-tier slave node 523c functions as a second-tier master node with respect to second-tier slave nodes 533 connected to the secondary data bus 513. Others of the first-tier slave nodes 523 can also serve as second-tier master nodes and be connected to different secondary buses having additional second-tier slave nodes. A multi-level or multi-tiered hierarchical control network is thereby established.

Each of the master node 503, first-tier slave nodes 523, second-tier slave nodes 533, and other lower-level slave nodes (not shown in FIG. 5) are referred to hereinafter generically as "nodes" and are designated as nodes 530 in FIG. 5. In one aspect of a preferred embodiment as shown in FIG. 5, each of the nodes 530 has substantially the same hardware configuration and can therefore function as either a master node or a slave node, depending upon how the control network 501 is configured. Each data bus, along with the nodes attached to it, are generally referred to as a cell, and the master node connected to the data bus is referred to as a "cell controller" for that particular cell. As explained in more detail hereinafter, each node 530 configured as a master node transmits and receives messages over the data bus for the cell it controls. Each node 530 configured as a slave node remains in a listen mode, receiving but not transmitting messages over that data bus, unless specifically requested to transmit information over the data bus by the master node. Any number of the slave nodes can, even though operating as a slave node with respect to an upper tier, be simultaneously operating as a master node with respect to other lower-tier slave nodes at a different cell sub-level.

A preferred embodiment of the invention, as noted, comprises a mechanism for redundant backup control of any node functioning as a master node at any level or sub-level of the control network 501. As generally described, in operation of a preferred embodiment of the invention the slave nodes connected to a particular data bus monitor the data bus while in a listen mode and await periodic signals from the master node for that data bus. Upon a failure to receive a signal from a master node within an expected time, the slave nodes connected to that data bus begin a wait period (which is preferably a different wait period for each slave node connected to the data bus). When the wait period elapses, the slave node determines that a failure in the master node for the particular data bus has occurred, and takes steps to take over the functionality of the master node. Each of the slave nodes is programmed with a different wait period, so that there is no contention for replacing the master node when a master node failure has occurred. In one aspect, backup control of each master node is prioritized, such that there is a specific order in which the slave nodes can potentially take over control of the master node functionality when a failure has occurred.

In more detail, again with reference to FIG. 5, one of the nodes 530 attached to the main data bus 504 is configured as a master node 503. The other nodes 530 attached to the main data bus 504 (in this example numbering four such nodes 530) are configured as first-tier slave nodes 523, meaning that they receive but do not transmit master-control signals over the main data bus 504. The first-tier slave nodes 523 may, however, from time to time send responsive signals or status signals over the main data bus 504.

In a preferred embodiment, each of the first-tier slave nodes 523 may be configured as a second-tier master node controlling a secondary bus. One such example is shown in FIG. 5, wherein first-tier slave node 523c is connected to a secondary data bus 513. A plurality of other nodes 530 are also attached to the secondary bus data 513, and serve as second-tier slave nodes 533. There are three such second-tier slave nodes 533 in the example shown in FIG. 5. With respect to the secondary data bus 513, the first-tier slave/second-tier master node 523c transmits master-control signals to the second-tier slave nodes 533. The second-tier slave nodes 533 ordinarily operate only in a listen mode, but from time to time may send responsive messages or status messages to the second-tier master node 523c. The other first-tier slave nodes 523a, 523b and 523d may similarly be connected as second-tier master nodes (i.e., cell controllers) each controlling its own secondary bus or cell.

While the control network 501 shown in FIG. 5 has four first-tier slave nodes 523 and three second-tier slave nodes 533, the number of first-tier slave nodes 523 and second-tier slave nodes 533 is limited only by the ability of the master node to communicate with the slave nodes over the particular data bus. There may be more slave nodes or fewer slave nodes on each bus than shown in the control network 501. In a preferred embodiment, there are no more than eight such cell controllers, although more than eight may be used so long as processing capacity and speed permit.

Figure 7:
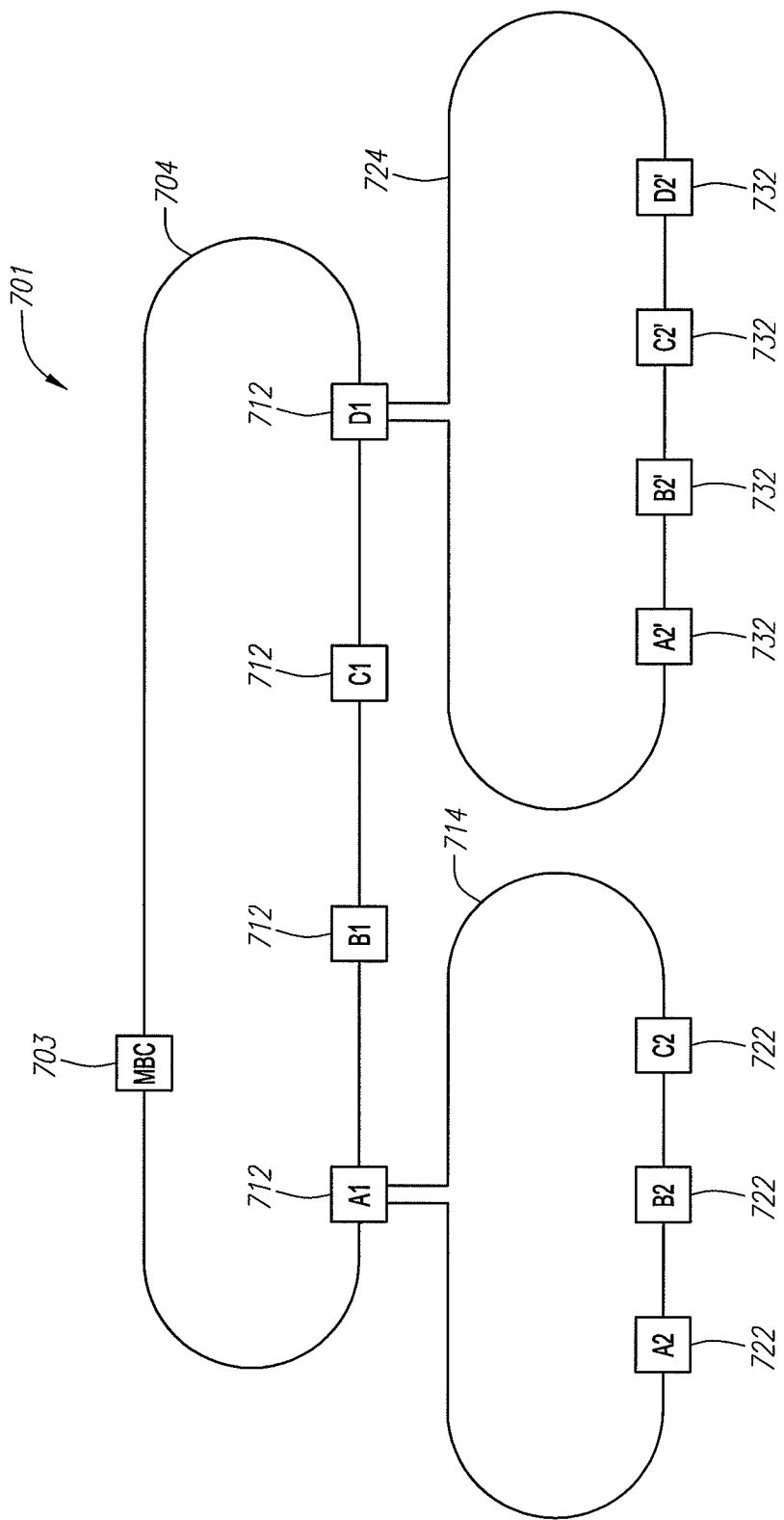
FIG. 7 is a diagram of a hierarchical control network in accordance with one embodiment of the present invention having multiple second-tier buses.
Figure 8:
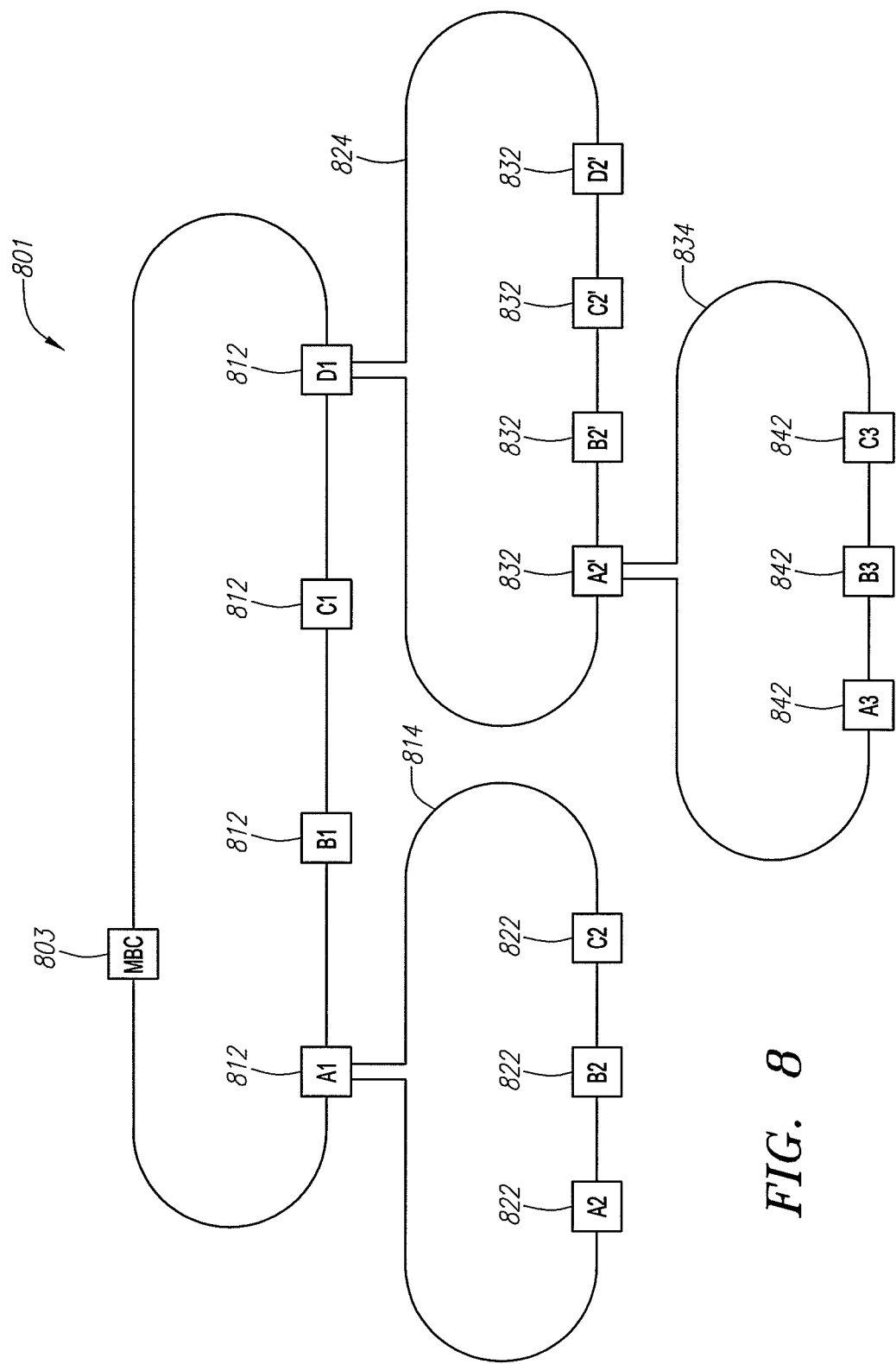
FIG. 8 is a diagram of a hierarchical control network in accordance with another embodiment of the present invention having a third-tier bus.
Figure 9:
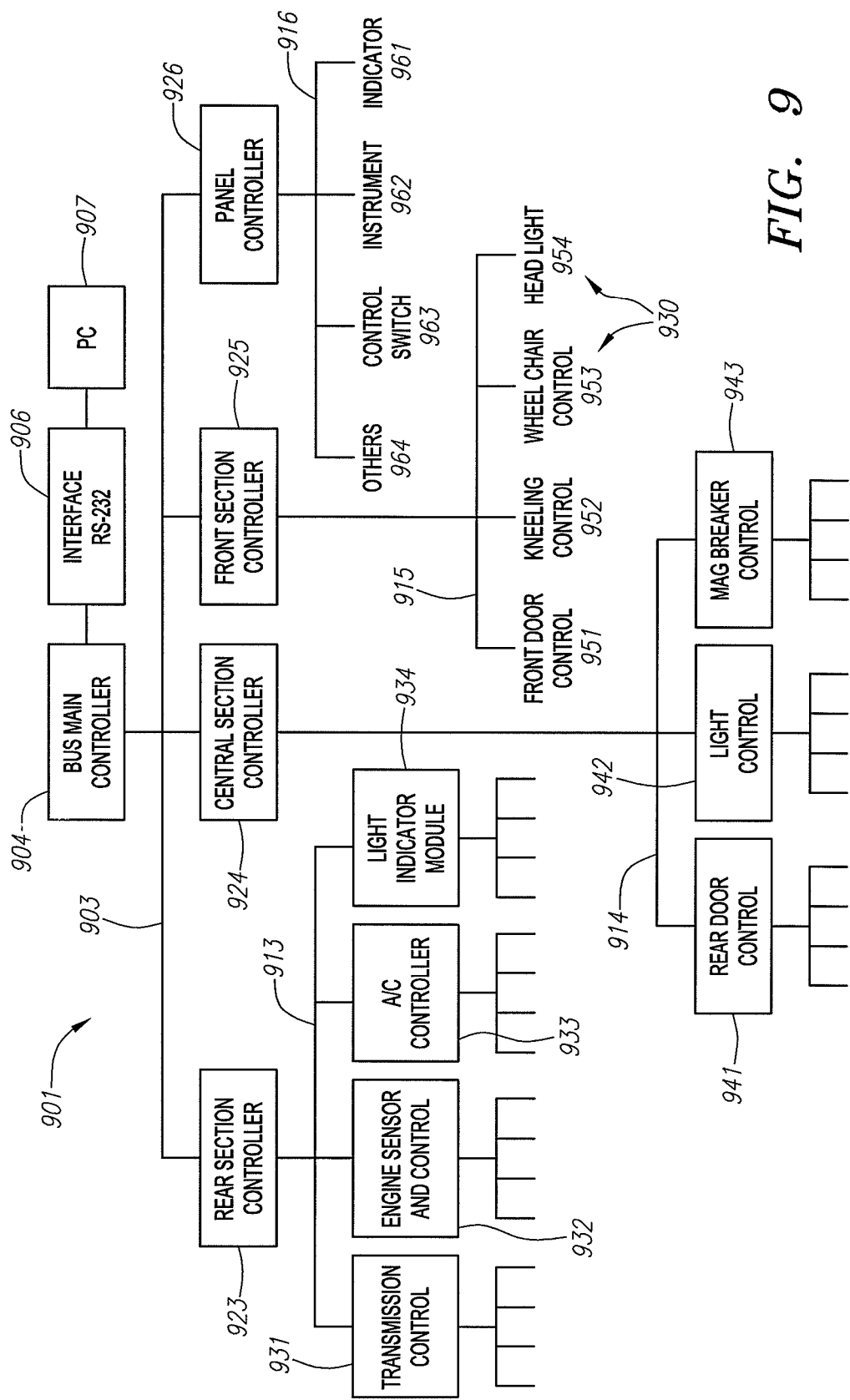
FIG. 9 is a functional diagram of a multi-bus control network illustrating one example of bus architectural layout and node functionality according to one embodiment of the invention.

In addition, further levels of control nesting beyond two data buses may also be provided, using a similar approach to the two data bus method. Thus, for example, one or more of the second-tier slave nodes 533 may be configured as a third-tier master node controlling its own tertiary or third-tier data bus. While FIG. 5 only shows two nested control levels, the same control concepts would apply to a control network architecture having additional nested control levels. Examples of control networks having more than two data buses are depicted in FIGS. 7, 8 and 9 and described in more detail hereinafter.

In a preferred embodiment, communication over the main data bus 504 and the secondary data bus 513 (or buses, if appropriate) is time-multiplexed such that only one node 530 is transmitting over a particular data bus at a given time. Usually, each transmitted message will be targeted for a specific destination node 530, which may be specified by address bits in the transmitted message. However, in some embodiments broadcast messages may also be used targeted to multiple nodes 530.

Responsibilities for tasks, or groups of tasks, may be assigned to specific nodes 530. For example, each of the first-tier slave nodes 223 may be assigned a distinct sphere of responsibility. Similarly, each of the second-tier slave nodes 533 may be assigned a distinct sphere of responsibility. Examples of tasks that may be assigned to different nodes 530 are described for an exemplary control network later herein, with respect to FIG. 9.

Each of the nodes 530 preferably comprises an uplink transceiver 507, a downlink transceiver 508, and a switch 509. Each of the nodes 530 receives signals over its downlink transceiver 508. Over the main data bus 504, the first-tier master node 503 transmits master-control signals to each of the first-tier slave nodes 523. From time to time, according to the programmed control protocol, the first-tier slave nodes 523 respond to the master-control signals, or otherwise send status messages to the first-tier master node 503 when events occur specific to that first-tier slave node 523. Otherwise, the first-tier slave nodes 523 do not ordinarily communicate with each other.

In a similar manner, over each secondary data bus (such as secondary data bus 513), the second-tier master node 523 (for example, first-tier slave/second-tier master node 523c in FIG. 5) transmits master-control signals to each of the second-tier slave nodes 533 connected to the same secondary data bus. From time to time, according to the programmed control protocol, the second-tier slave nodes 533 respond to the master-control signals, or otherwise send status messages to the second-tier master node 523c when events occur specific to that second-tier slave node 533. Otherwise, the second-tier slave nodes 523 do not ordinarily communicate with each other.

Communication between nodes is preferably carried out using half-duplex time division multiplexing. In typical operation, the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. Each of the slave nodes are polled in turn so that the master node can keep track of events happening throughout the system.

A communication protocol is preferably established so as to avoid collisions on each of the data buses. A simple and effective communication protocol is one in which the master node for the particular data bus sends a control message to a particular slave node, which responds with an acknowledgment or status message within a predetermined amount of time before the master node contacts another slave node. Slave nodes generally do not initiate communication without being first polled by the master node. The master node may also send out a broadcast control message that is intended for receipt by more than one of the slave nodes. The broadcast control message can comprise a node identification number or address that instructs a single particular node to respond to the broadcast control message. Usually, the single node selected for response will be the most critical node requiring receipt of the broadcast control message.

Failure of the current master node (at any of the control levels) commonly results in the master node either failing to transmit, or else transmitting improper control information to the slave nodes over the data bus. According to a preferred redundant backup control protocol, the slave nodes periodically receive master-control messages from the master node and, in the event that proper master-control messages fail to appear, initiate a failure mode response procedure.

Figure 6:
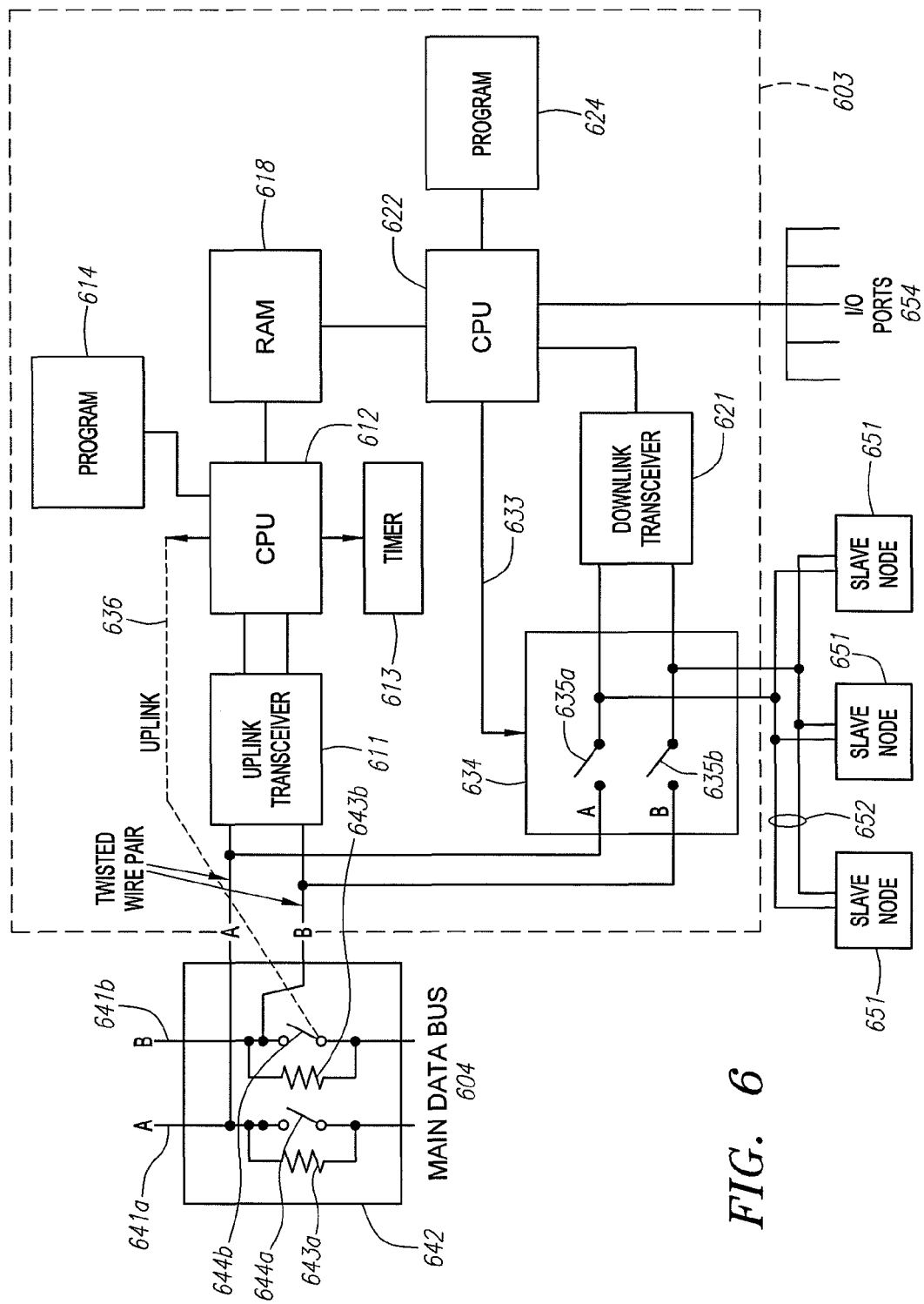
FIG. 6 is a block diagram of a preferred node within the control network architecture shown in FIG. 5.

Detection of and response to a failure mode condition may be explained in greater detail with reference to FIG. 6, which is a block diagram of a preferred embodiment depicting most of the main components of a node (such as any of nodes 530 shown in FIG. 5). Because failure mode detection and response is carried out by a node 530 operating as a slave node, the following discussion will assume that the node 603 shown in FIG. 6 is initially configured as a slave node. Further, for simplicity of explanation, it will be assumed that the node 603 shown in FIG. 6 is a first-tier slave/second-tier master node connected to a main bus and a secondary bus (such as first-tier slave/second-tier master node 523c connected to the main data bus 504 and secondary data bus 513 in FIG. 5), although the same node circuit configuration is preferably used for each of the nodes 530, regardless of control level, for ease of construction and flexibility purposes.

In the node block diagram of FIG. 6, a node 603 is shown connected to a first bus (e.g., main bus) 604. The node 603 comprises an uplink transceiver 611, a downlink transceiver 621, a CPU 612 connected to the uplink transceiver 611, and another CPU 622 connected to the downlink transceiver 621. Both CPUs 612, 622 are preferably connected to a dual-port RAM 618, and each CPU 612, 622 is connected to a ROM program store 614 and 624, respectively. The second CPU 622 is connected through an appropriate interface to I/O ports 654, which may comprise sensor inputs, control signal outputs, status LEDs, LCD display, keypad, or other types of external connections. It will be understood that the node 603 of FIG. 6 can have all the components and functionality of the node 301 shown in FIG. 3; however, in FIG. 6 only certain basic components needed for explaining the operation of the invention are depicted.

Each node 603 is preferably capable of both sending and receiving messages (e.g., control instructions). Typically, the uplink transceiver 611 operates in a "slave" mode whereby the node 603 receives control instructions using the uplink transceiver 611 and then responds thereto, and the downlink transceiver 621 operates in a "master" mode whereby the node 603 issues control instructions (e.g., polls slave nodes) and awaits a response from other nodes after sending such control instructions.

The downlink transceiver 621 of the node 603 is connected to a secondary data bus 652, to which is also connected a plurality of second-tier slave nodes 651 (assuming the node 603 is a first-tier slave/second-tier master node). The node 603 thereby functions as a first-tier slave node with respect to the main data bus 604, receiving with its uplink transceiver 611 first-tier master-control signals over the main bus 604 from a first-tier master node (such as master node 503 shown in FIG. 5), and also functions as a second-tier master node with respect to the secondary data bus 652, transmitting second-tier master-control signals with its downlink transceiver 634 to second-tier slave nodes 651.

The node 603 also comprises a pair of switches 635*a*, 635*b* connected between the downlink transceiver 621 and the signal lines 643*a*, 643*b* of the main data bus 604. In normal operation, the switches 635*a*, 635*b* remain open (unless the node 503 is also the first-tier master node, such as master node 503 shown in FIG. 5, in which case the switches 635*a*, 635*b* would be closed), and the downlink transceiver 621 is thereby isolated from the main data bus 604. However, when a first-tier master node failure condition is detected, switches 635*a*, 635*b* are closed, enabling the downlink transceiver 621 to take over for the first-tier master node. The downlink transceiver 621 would therefore function simultaneously as master node with respect to both the main data bus 604 and the secondary data bus 652.

In a preferred embodiment, detection of a master node failure condition on the main data bus 604 is accomplished using a timer mechanism, such as a hardware timer 613 accessible (either directly or indirectly) by the CPU 612 that is connected to the uplink transceiver 611. According to a preferred control protocol (assuming the node 603 is a first-tier slave/second-tier master node), the uplink transceiver 611 of node 603 receives first-tier master-control signals periodically from the first-tier master node (such as master node 503 in FIG. 5). The master-control signals may, for example, request status information from the node 603, or instruct the node 603 to carry out certain control or input/output functions. The node 603 ordinarily responds by carrying out the requested functions and/or sending an acknowledgment or status signal to the first-tier master control node using the uplink transceiver 611.

Timer 613 times out a wait period between master-control signals received from the first-tier master control node. In a preferred embodiment, each time the uplink transceiver 611 receives a master-control signal from the first-tier master node that is recognized as an appropriate master-control signal within the particular programmed control protocol (whether or not the master-control signal is directed to the particular node 603), the CPU 612 connected to the uplink transceiver 612 resets the timer 613. If the timer 613 ever times out, then CPU 612 responds by asserting a failure mode response procedure. The timing out of timer 613 may result in an interrupt to CPU 612 in order to inform the CPU 612 of the failure to receive master-control signals, or else the CPU 612 may periodically monitor the timer 613 and, when the CPU 612 notices that the timer 613 has timed out, assert a failure mode response procedure.

When a failure mode condition is detected, the CPU 612 sets a failure mode status bit in a predetermined flag location within the dual-port RAM 618. The other CPU 622 periodically monitors the failure mode status bit in the dual-port RAM 618 and is thereby informed when a failure occurs. Alternatively, instead of the CPUs 612, 622 communicating through the dual-port RAM 618, timer 613 can directly inform CPU 622 when a failure to receive master-control signals has occurred (i.e., when timer 613 has timed out).

When the CPU 622 has been informed or otherwise determined that a failure mode condition exists, and that the first-tier master node has presumably failed, the CPU 622 sends a signal over control line 633 to close switches 635*a*, 635*b*, thereby connecting the downlink transceiver 621 to the main bus 604. From that point on, the CPU 622 performs as the first-tier master node with respect to the main bus 604. The node 603 can continue to receive information over the main data bus 604 using the uplink transceiver 611. Alternatively, the node 603 may thereafter perform all transmission and reception over both the main bus 604 and the secondary bus 652 using the downlink transceiver 621. When the failure mode is entered, the CPU 622 may be programmed so as to directly carry out the I/O port functions for which it previously received instructions from the first-tier master node, or the node 603 may send master-control signals to its own uplink transceiver 611 and thereby continue to carry out the I/O port functions as it had previously been doing. In other words, the node 603 can give itself control instructions over the main data bus 604 so that it can continue to perform its previously assigned functions. If, after taking over for the first-tier master node, the node's downlink transceiver 611 should fail, the node 603 can still continue to perform its control functions when the next slave node takes over control as the new first-tier master node (as later described herein), because its uplink transceiver 611 continues to function in a normal manner.

According to the above described technique, the node 603 thereby substitutes itself for the first-tier master node upon the detection of a first-tier master node failure as indicated by the failure to receive the expected first-tier master-control signals. Should the node 603 fail, either before or after taking over control for the first-tier master node, the next first-tier slave node would take over and become the first-tier master node in a similar manner to that described above.

Referring again to FIG. 5, the order in which the first-tier slave nodes 523 take over for the first-tier master node 503 is dictated by the wait period timed out by the timer 613 of the particular first-tier slave node 523. The timer 613 (see FIG. 6) for each first-tier slave node 523 is programmed or reset using a different time-out value. A first-tier slave node 523 only asserts a failure mode condition when its internal timer 613 reaches the particular timeout value programmed for that particular node 523.

While the programmed wait periods for the internal timer 613 in each first-tier slave node 523 can vary depending upon the control application, illustrative wait periods are programmed in ten millisecond increments. Thus, for example, first-tier slave node 523*a* could be programmed with a 10 millisecond wait period; the next first-tier slave node 523*b* could be programmed with a 20 millisecond wait period; the next first-tier slave node 523*c* could be programmed with a 30 millisecond wait period; and the last first-tier slave node 523*d* could be programmed with a 40 millisecond wait period; and so on. First-tier slave node 523*a* would take over as the first-tier master node if 10 milliseconds elapses without it receiving any proper first-tier master-control signals; the next first-tier slave node 523*b* would take over as the first-tier master node if 20 milliseconds elapses without it receiving any proper first-tier master-control signals; the next first-tier slave node 523*c* would take over as the first-tier master node if 30 milliseconds elapses without it receiving any proper first-tier master-control signals; and so on.

Use of 10 millisecond increments for the wait periods in the above example is considered merely illustrative, and the actual wait periods should be selected depending upon the time criticality of the control messages, and the number of messages that may be missed before a high enough degree of certainty is established that the master node has failed. For example, if a slave node expects to observe a control-message signal on the data bus no later than every 5 milliseconds, then the slave node may be programmed to assert a failure mode condition after a wait period corresponding to the absence of a predefined number of messages—for example, twenty messages (i.e., 100 milliseconds). If critical aspects of the system requiring master node control need to be serviced in a shorter time period, then the wait period would have to be reduced to accommodate the time-sensitive components of the system.

The order in which the slave nodes take over for the master node need not be dictated by the relative position in the control loop of the slave node with respect to the master node, but rather may be dictated according to the programmed wait period in each slave node. Flexibility is thereby provided in the order of priority in which the slave nodes take over for the master node in the event of a failure event.

Accordingly, by use of the techniques described herein, redundant backup for the first-tier master node 503 is provided. Such redundant backup control is provided without requiring additional physical nodes to be located within the control system, and without having to provide wiring for such additional physical nodes to the buses 504 or 513. The redundant backup for the master node 504 is also accomplished while resolving contention problems that might otherwise occur if each of the first-tier slave nodes 523 were programmed with the identical timeout period.

In a preferred embodiment, redundant backup control is provided in a similar manner for the secondary data bus 513, and each additional data bus that may be provided in the system (e.g., in systems such as shown in FIGS. 7, 8 or 9). Thus, each of the second-tier slave nodes 533 is preferably configured with the circuitry shown for node 603 in FIG. 6, and each of the second-tier slave nodes 533 can therefore substitute itself for the first-tier slave/second-tier master node 523*c* if the first-tier slave/second-tier master node 523*c* fails.

If a particular node is operating as a master node for two buses as a result of a failure of the master node on a higher-tier bus, and the node operating as such fails, then it is possible that two different nodes will take over for the failed node, one node taking over on each bus. For example, supposing that first-tier slave/second-tier master node 523*c* has already taken over as the first-tier master node due to a failure of the master node 503, and further suppose that first-tier slave/second-tier master node 523*c* too fails, then the next first-tier slave node 523*d* would take over as the first-tier master node with respect to the main data bus 504, but the first second-tier slave node 533*a* would take over as second-tier master node with respect to the secondary data bus 513.

In the above manner, despite the failure of one or more nodes, substantial functionality of the control system as a whole can be maintained. A failed node is essentially discarded or bypassed to the extent possible so as to maintain the highest possible degree of continued operability. Furthermore, because certain parts of the system will continue operate despite the failure of the master node, identification of the failed node by engineers or maintenance personnel should be simplified by being able to identify the inoperative portion of the system that has become isolated due to the failure.

In one aspect, separation of responsibility in each node 603 of master functions and slave functions between two different CPUs each operating with a different transceiver allows the node 603 to potentially continue operating as either a master node or a slave node should one of the CPUs fail, providing that the failure does not disrupt both of the transceivers at the node 603.

In a preferred embodiment, the nodes 530 of FIG. 5 are wired using a single cable connecting all of the nodes 530 in a loop configuration. Details of such a wiring technique are described in U.S. Pat. No. 5,907,486 entitled "Wiring Method and Apparatus for Distributed Control Network," assigned to the assignee of the present invention, and previously incorporated herein by reference.

In a preferred embodiment, the nodes 530 of FIG. 5 are configured with fault isolation and recovery circuitry in the case of a short circuit or similar event. Details of such fault isolation and recovery circuitry are described in U.S. Pat. No. 6,147,967 entitled "Fault Isolation and Recovery In A Distributed Control Network," previously incorporated herein by reference.

FIGS. 7, 8 and 9 depicts various embodiments having more than two data buses, so as to provide additional levels of control beyond that afforded by a dual-bus architecture. Each of the nodes shown in FIGS. 7, 8 and 9 is preferably configured to include the circuitry shown for preferred node 603 in FIG. 6. FIG. 7 shows an example of a system architecture for a control network having three data buses 704, 714 and 724. A first-tier master node 703 and a plurality of first-tier slave nodes 712 are connected to the main data bus 704. One of the first-tier slave nodes 712, designated as A1 in FIG. 7, operates as a second-tier master node, and is connected to the second data bus 714 along with a plurality of second-tier slave nodes 722. Another of the first-tier slave nodes 712, designated as D1 in FIG. 7, operates as another second-tier master node, and is connected to the third data bus 724 along with another plurality of second-tier slave nodes 732. The other first-tier slave nodes 712, designated B1 and C1 in FIG. 7, could also be configured as master nodes of a second-tier bus. FIG. 7 thereby provides a hierarchical control network 701 having two control levels or tiers, and three data buses.

FIG. 8 shows an example of a system architecture for a control network having four buses 804, 814, 824 and 834. In a similar manner to FIG. 7, a first-tier master node 803 and a plurality of first-tier slave nodes 812 are connected to the main data bus 804. One of the first-tier slave nodes 812, designated as A1 in FIG. 8, operates as a second-tier master node, and is connected to the second data bus 814 along with a plurality of second-tier slave nodes 822. Another of the first-tier slave nodes 812, designated as D1 in FIG. 8, operates as another second-tier master node, and is connected to the third data bus 824 along with another plurality of second-tier slave nodes 832. One of the second-tier slave nodes 832 connected to the third data bus 824, denoted as A2' in FIG. 8, operates as a third-tier master node with respect to the fourth data bus 834, which is connected to a plurality of third-tier slave nodes 842. FIG. 8 thereby provides a hierarchical control network 801 having three control levels or tiers, and four data buses.

It will be appreciated that, expanding the approach used in FIGS. 7 and 8, additional control levels may be created by adding successive lower control tiers, or additional slave nodes at any particular tier may be configured as cell controllers to control additional localized data buses. A great deal of flexibility is thereby provided in establishing a hierarchical control structure suitable for many different control applications.

FIG. 9 is a diagram showing, from a functional standpoint, an example of a particular control application having multiple data buses in accordance with the hierarchical control principles discussed herein. In FIG. 9, a control network 901 comprises a master node 904 which is connected to a plurality of slave nodes 923, 924, 925 and 926, each of which is assigned a particular sphere of responsibility within the control network. A main bus 903 forms a communication link between the master node 904 and the slave nodes 923, 924, 925 and 926.

Generally, the nature of the slave nodes 923, 924, 925 and 926 depends in part on the control application in which they are deployed. In the example of FIG. 9, the slave nodes 923, 924, 925 and 926 are deployed in a vehicle or railcar, and so the slave nodes 923, 924, 925 and 926 have functionality suited for such a control application. For example, the slave nodes include a slave node 923 operating as a rear section controller, a slave node 924 operating as a central section controller, a slave node 925 operating as a front section controller, and a slave node 926 operating as a panel controller. There may also be additional slave nodes if required.

Each of slave nodes 923, 924, 925 and 926 are considered first-tier slave nodes in the illustrative embodiment shown in FIG. 9. In the control network 901 of FIG. 9, two of the first-tier slave nodes 923, 924 also act as second-tier master nodes for additional data buses. Thus, first-tier slave node 923 operates as a second-tier master node with respect to a second data bus 913, and first-tier slave node 924 operates as a second-tier master node with respect to a third data bus 914. First-tier slave/second-tier master node 923 is connected to a plurality of second-tier slave nodes 931, 932, 933 and 934, which may each be assigned a sub-sphere of responsibility in the cell controlled by the rear section controller. The second-tier slave nodes may therefore include, for example, a slave node 931 operating as a transmission controller, a slave node 932 operating as an engine sensor and controller, a slave node 933 operating as an air conditioner controller, and a slave node 934 operating as a light indicator controller.

Similarly, first-tier slave/second-tier master node 924 is connected to another plurality of second-tier slave nodes 941, 942 and 943, each of which may be assigned a sub-sphere of responsibility in the cell controlled by the central section controller. The second-tier slave nodes may therefore include, for example, a slave node 941 operating as a rear door controller, a slave node 942 operating as a light controller, and a slave node 943 operating as a magnetic breaker controller.

Each of the first-tier slave nodes 923, 924, 925 and 926 (even if operating as a second-tier master node) may be connected to one or more input/output modules 930. For example, the slave node 925 operating as a front section controller may be connected to a front door control module 951, a kneeling mechanism control module 952, a wheel chair platform control module 953, and a headlight output module 954. Likewise, the slave node 926 operating as a panel controller may be connected to an indicator module 961, an instrument module 962, a control switch module 963, and other miscellaneous modules 964. Virtually any type of input/output or control function may be represented as a module 930. In each instance, the respective slave node 923, 924, 925 and 926 controls the input/output modules 930 connected to it.

The master node 904 may be connected to a computer 907 through an interface 906 (such as an RS-232 interface), if desired. Through the computer 907, the master node 904 can be instructed to execute certain functions or enter certain control modes. Also, the master node 904 can be monitored or reprogrammed through the computer 907.

In operation, the master node 904 communicates with the cell controllers 923, 924, 925 and 926 using the main bus 903. The master node 904, as previously described, is generally responsible for delegating control commands to the slave nodes 923, 924, 925 and 926, and for responding to status information and events communicated to the master node 904 over the main bus 903. Each of the slave nodes 923, 924, 925 and 926 receives commands from the master node 904, and issues appropriate commands to their respective second-tier slave nodes 931-934 or 941-943, or input/output modules 930.

Generally, the slave nodes are disposed in physical locations near the mechanisms which they control. The main data bus 904 and secondary data buses 913, 914 each form a loop connecting the various nodes connected to the bus in a continuous fashion. The data buses 904, 913 and 914 are not restricted to any particular baud rate. Rather, communication may be carried out over each data bus 904, 913 and 914 at a rate that is suitable for the particular control application. Moreover, there is no particular requirement that the data buses in the FIG. 9 control network (or the more generalized control networks shown in FIGS. 7 and 8) be serial data buses. Rather, the data buses may be parallel data buses in situations, for example, where a high data bandwidth is required.

In the particular control application relating to FIG. 9, each of the nodes is preferably housed in a rugged, potted case made of a suitable lightweight material such as aluminum that provides environmental protection and allows for heat dissipation, as previously described with respect to FIG. 4. In other control environments, other types of housings may be used.

Figure 10:
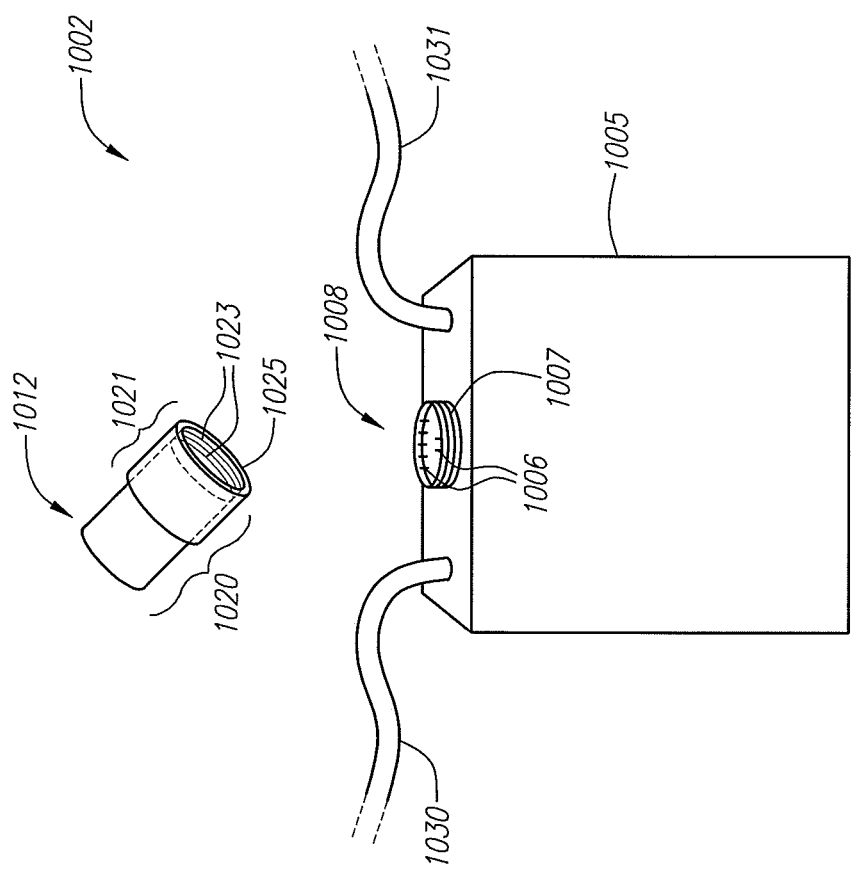
FIG. 10 is a diagram of a node housing illustrating attachment of a plug-in module.

FIG. 10 is a diagram illustrating an example of a network node 1002 including a node housing 1005 to which a plug-in module 1012 may be attached. The network node 1002 may be used in any of the exemplary hierarchical control networks described previously herein, or in any other type of control network in which it is required to replace or reprogram existing network nodes. By use of the plug-in module 1012, according to certain embodiments as disclosed herein, association of a node identifier and/or functional program code with the network node 1002 may be carried out in a rapid and convenient manner, without the need for specialized equipment, and without the possibility of erroneous manual entry of the node identifier.

According to a preferred embodiment, as depicted in FIG. 10, the network node housing 1005 contains the electronics of the network node 1002, including one or more processors and various I/O functions. In a preferred embodiment, the electronics within the network node housing 1005 are similar to that depicted in FIG. 6, and are described in more detail below with respect to FIG. 11. With respect to the physical features of the network node 1002 depicted in FIG. 10, the network node housing 1005 includes an external port 1008 to which the plug-in module 1012 can be physically attached. In one embodiment, for example, the plug-in module 1012 takes the form of an enclosed cylindrical unit having a cylindrical module body 1020 containing electrical components.

Wrapped about the periphery of the cylindrical module body 1020, at one end, is a cylindrical attachment piece 1021 having an inner threading 1025. The external port 1008 of the network node housing 1005 may take the form of a relatively short, cylindrically-shaped extension as shown in FIG. 10, with an outer threading 1007 for receiving the cylindrical attachment piece 1021. The cylindrical attachment piece 1021 is rotatable, and may be screwed onto the cylindrically-shaped extension (i.e., external port 1008) to secure the plug-in module 1012 to the node housing, in the manner as is commonly done to fasten certain types of plastic piping together, for example.

In one embodiment, the external port 1008 comprises an arrangement of pins 1006 protruding upwards, emanating from the top of the external port 1008. The plug-in module body 1020 includes a matching arrangement of holes 1023 for receiving the pins 1006. When the plug-in module 1012 is secure fastened to the node housing 1005, the pins 1006 atop the external port 1008 fit snugly into the holes 1023 along the base of the plug-in module fit 1012. Alternatively, the pins may be located on the base of the plug-in module body 1020, while the holes would then be located atop the external port 1008 on the node housing 1005.

As further shown in FIG. 10, cables 1030 and 1031 forming a portion of the continuous, common bus are attached or connected to the node housing 1005, to allow the node 1002 to be included as part of a network such as depicted in any of FIG. 2, 7, 8 or 9, for example.

Figure 11:
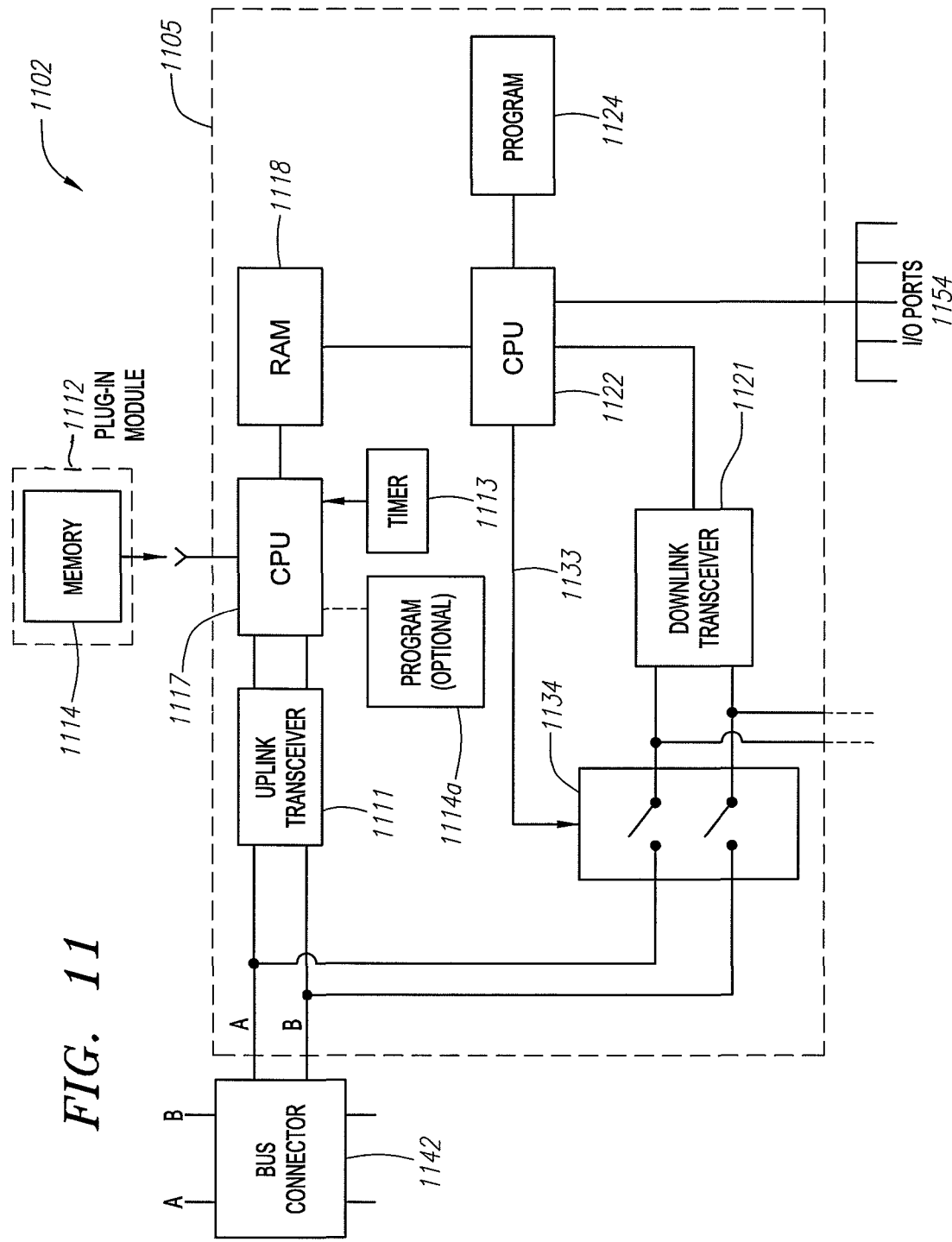
FIG. 11 is a conceptual diagram illustrating electrical connection of the readable memory within a plug-in module to the electrical components of the node.

In a preferred embodiment, the plug-in module 1012 contains a programmable memory which, when the plug-in module 1012 is attached to the node housing 1005, allows electronic interconnection between the electronics of the network node housing 1005 and the programmable memory. Details of preferred electronics, at a block diagram level, are illustrated in FIG. 11. As shown therein, a preferred network node 1102 may comprise many of the same electrical components as illustrated for the node in FIG. 6. Thus, the network node housing 1105 may contain, among other things, an uplink transceiver 1111, a downlink transceiver 1121, a CPU 1117 connected to the uplink transceiver 1111, and another CPU 1122 connected to the downlink transceiver 1121. Both CPUs 1117, 1122 are preferably connected to a dual-port RAM 1118, and each CPU 1117, 1122 may be connected to a ROM program store 1114a and 1124, respectively. The second CPU 1122 is connected through an appropriate interface to I/O ports 1154, which may comprise sensor inputs, control signal outputs, status LEDs, LCD display, keypad, or other types of external connections. It will be understood that the node 1102 of FIG. 11 can have all the components and functionality of the node 301 shown in FIG. 3; however, in FIG. 11 only certain components are depicted for the sake of simplicity.

Similar to node 603 in FIG. 6, the node 1102 is preferably capable of both sending and receiving messages (e.g., control instructions). Typically, the uplink transceiver 1111 operates in a "slave" mode whereby the node 1102 receives control instructions using the uplink transceiver 1111 and then responds thereto, and the downlink transceiver 1121 operates in a "master" mode whereby the node 1102 issues control instructions (e.g., polls slave nodes) and awaits a response from other nodes after sending such control instructions. The downlink transceiver 1121 may be connected to a secondary data bus, to which may also be connected a plurality of lower-tier slave nodes.

The node 1102 may also comprise a pair of switches 1134 connected between the downlink transceiver 1121 and the signal lines and bus connector 1142, the purpose of which has been described in detail above with reference to FIG. 6. A timer mechanism, such as timer 613 accessible to CPU 1117, may be used to detect a master node failure condition on the main data bus connected to the bus connector 1142.

A preferred communication protocol for the node 1102 within a control network system involves the ability to identify each node 1102 with a unique identifier. Communication between nodes may be carried out, for example, using half-duplex time division multiplexing, wherein the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. According to one embodiment, each of the slave nodes are polled in turn so that the master node can keep track of events happening throughout the system.

To facilitate identification of the node 1102, a readable memory 1114 contained within the plug-in module 1112 stores a unique node identifier which becomes associated with the node 1102 when the plug-in module 1112 is secured to the module housing 1105. The readable memory 1114 is defined within the address space of the node 1102. Once the plug-in module 1112 is connected, the CPU 1117 accesses the node identifier at the address provided for the readable memory 1114, and uses the node identifier in subsequent communication activities. The CPU 1117 may, for example, determine which messages are targeted to the node 1102, and may insert the node identifier in messages transmitted from the node 1102. The CPU 1117 may share the node identifier with the second CPU 1122 by loading into the dual-port RAM 1118, at a specified location.

In addition, the readable memory 1114 may also include functional program code for the node 1102. The CPU 1117 may be programmed so that it first attempts to utilize the functional program code, if any, stored in the readable memory 1114, and if then secondarily attempts to utilize the functional program code stored in the program ROM 1114a. The functional program code stored in the readable memory 1114 may be shared with the second CPU 1122 if desired by downloading it to the dual-port RAM 1118.

Accordingly, the node 1102 may be programmed or re-programmed with a unique node identifier and functional program code simply by connecting or replacing the plug-in module 1112, avoiding the need to download a node identifier or functional program code from specialized equipment, and increasing the speed and convenience by which a node 1102 can be programmed or re-programmed.

The readable memory 1114 may contain any type of persistent data memory, including read-only memory (ROM), programmable ROM (PROM), or electrically-erasable programmable ROM (EEPROM), such as a flash memory, for example.

Figure 12:
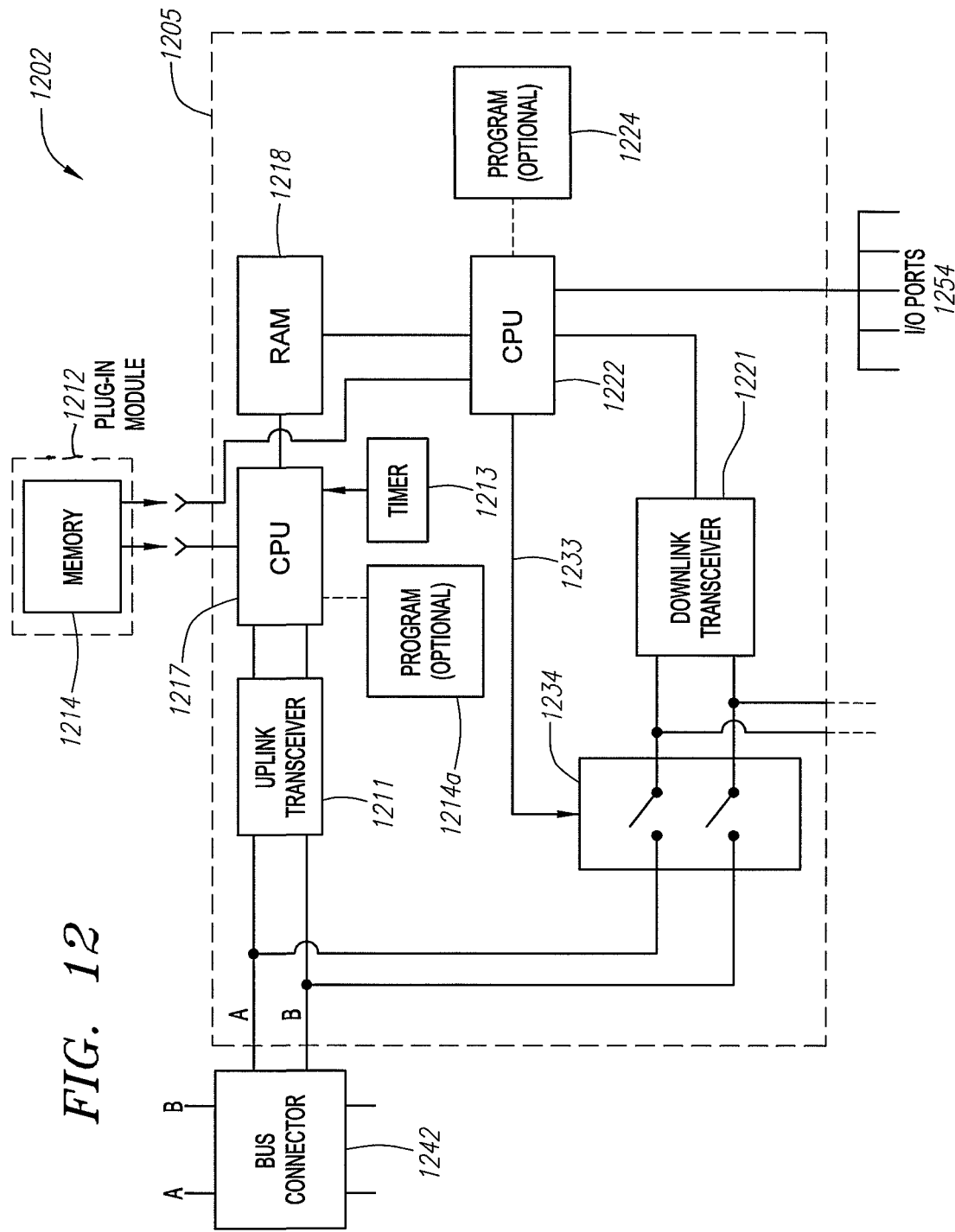
FIG. 12 is a conceptual diagram illustrating electrical connection of the readable memory within a plug-in module to the electrical components of the node, in accordance with an alternative embodiment as described herein.

FIG. 12 is a conceptual diagram illustrating an alternative embodiment as described herein, and like FIG. 11 showing electrical connection of a readable memory within a plug-in module to the electrical components of the node. The components illustrated in FIG. 12 are generally analogous to those shown in FIG. 11. Thus, network node 1202 may comprise a network node housing 1205 which may contain, among other things, an uplink transceiver 1211, a downlink transceiver 1221, a CPU 1217 connected to the uplink transceiver 1211, and another CPU 1222 connected to the downlink transceiver 1221, operating in a manner similar to that described for FIG. 11. Both CPUs 1217, 1222 are preferably connected to a dual-port RAM 1218, and each CPU 1217, 1222 may optionally be connected to a ROM program store 1214a and 1224, respectively. The second CPU 1222 is connected through an appropriate interface to I/O ports 1254, which may comprise sensor inputs, control signal outputs, status LEDs, LCD display, keypad, or other types of external connections, as described with respect to FIG. 11 and other embodiments herein.

The main difference between the node 1102 depicted in FIG. 11 and the node 1202 depicted in FIG. 12 is that the node 1202 depicted in FIG. 12 has a second electrical connection directly from the readable memory 1214 of the plug-in module 1212 to the second CPU 1222, so that the second CPU 1222 can obtain direct access to the unique node identifier as well as any functional program code stored in the readable memory 1214. The readable memory may be partitioned, or may physically comprise two separate memory chips, to avoid conflicts between the two CPUs 1217 and 1222 in accessing the information stored in the readable memory 1214. In all other respects, operation of the node 1202 of FIG. 12 is essentially the same as the node 1102 depicted in FIG. 11.

From the standpoint of physical construction, the node housing 1005 (or 1105 or 1205) may comprise a rugged, potted case made of a suitable lightweight material such as aluminum that provides environmental protection and allows for heat dissipation.

The plug-in module 1012 (or 1112 or 1212) can take a wide variety of alternative forms. It may be of any other shape that is convenient, such as rectangular, square, or polygonal. Likewise, the external port 1008 may be in the form of an inset, cavity or depression rather than an extension, with the plug-in module 1012 inserting snugly inside the port. Further, the plug-in module 1012 may be fastened to the node housing 1005 by other suitable means besides using an encapsulating threaded screw mechanism as shown in FIG. 10. For example, the plug-in module 1012 may snap into the node housing 1005, or may have one or more screws externally attached (similar to many common computer printer cables) to the plug-in module body 1020, which may be screwed in to corresponding holes in the node housing 1005. The particular plug-in module 1012 depicted in FIG. 10 provides the advantage of ease of manual attachment to the node housing 1005, as well as giving a very secure and stable connection. For applications in which the plug-in module 1012 needs to be particularly small, a snap-on fastening mechanism may be preferred.

Figure 13:
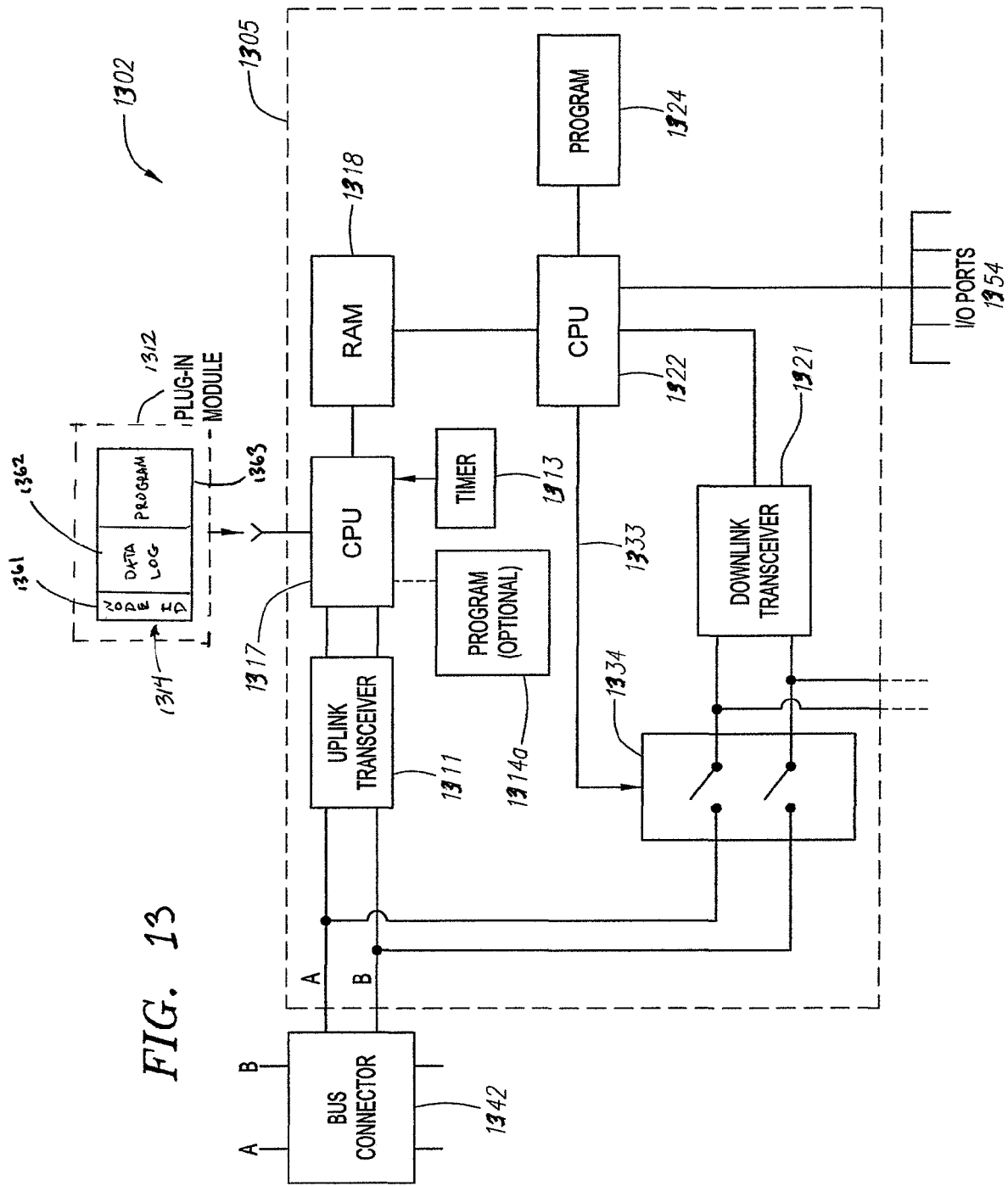
FIG. 13 is a conceptual block diagram similar to FIG. 11, illustrating an example of a plug-in module having a memory region for logging data during operation of the node.

FIG. 13 is a conceptual block diagram of another network node 1300 similar to that depicted in FIG. 11, and illustrating an example of a plug-in module having a memory region for logging data during operation of the node. The components illustrated in FIG. 12 are generally analogous to those shown in FIG. 11. Thus, network node 1302 in this example may comprise a network node housing 1305 which may contain, among other things, an uplink transceiver 1311, a downlink transceiver 1321, a CPU 1317 connected to the uplink transceiver 1311, and another CPU 1322 connected to the downlink transceiver 1321, operating in a manner similar to that described for FIG. 11. Both CPUs 1317, 1322 are preferably connected to a dual-port RAM 1318, and each CPU 1317, 1322 may optionally be connected to a ROM program store 1314a and 1324, respectively. The second CPU 1322 is connected through an appropriate interface to I/O ports 1354, which may comprise sensor inputs, control signal outputs, status LEDs, LCD display, keypad, or other types of external connections, as described with respect to FIG. 11 and other embodiments herein.

In FIG. 13, in accordance with one embodiment, the plug-in module 1312 comprises a memory 1314 which includes different portions or regions (either physically distinct or else logically partitioned). In the example of FIG. 13, the memory 1314 includes a node identifier portion 1361, a data/event log portion 1362, and a functional program portion 1363, although in other embodiments one or more of these portions may be omitted, or additional portions may be included. As with the embodiments of FIGS. 11 and 13, in order to facilitate identification of the node 1302, the memory 1314 contained within the plug-in module 1312 stores a unique node identifier, in this case in the node identifier portion 1361 of memory 1314. The unique node identifier serves the same purpose as previously described, i.e., it becomes associated with the node 1302 when the plug-in module 1312 is secured to the module housing 1305. The memory 1314 is preferably defined within the address space of the node 1302. Once the plug-in module 1312 is connected, the CPU 1317 accesses the node identifier at the address provided for the memory 1314, and uses the node identifier in subsequent communication activities. The CPU 1317 may, for example, determine which messages are targeted to the node 1302, and may insert the node identifier in messages transmitted from the node 1302. The first CPU 1317 may share the node identifier with the second CPU 1322 by loading into the dual-port RAM 1318, at a specified location.

In addition, as previously described in connection with prior embodiments, the memory 1314 may also include functional program code for the node 1302, in this case stored in a functional program portion 1363 of the memory 1314. The CPU 1317 may be configured so that it first attempts to utilize the functional program code, if any, stored in the memory 1314, and if then secondarily attempts to utilize the functional program code stored in the program ROM 1314a. The functional program code stored in the memory 1314 may be shared with the second CPU 1322 if desired by, e.g., downloading or otherwise transferring it to the dual-port RAM 1318.

In the embodiment of FIG. 13, the data/event log portion 1362 of the memory 1314 contained in the plug-in module 1312 is configured for storing data during operation of the node 1302, for later retrieval. The data/event log portion 1362 of the memory 1314 may, for example, be configured to store data from sensors, instruments, switches, and so forth, which are controlled or monitored by the network node 1302 during operation. The data/event log portion 1362 may also be used to store control data or internal parameters or settings, to maintain, for example, a record of how the node 1302 was configured or set up at different points in time. The data stored in the data/event log portion 1362 may be time stamped as it is stored. The data may be stored in the data/event log portion 1362 of the memory 1314 at regular or periodical intervals, and/or may be stored in response to a triggered event or alarm situation. At a later time, the plug-in module 1312 may be readily and rapidly removed, and the data stored thereon read out in order to review the operational history of the node 1302, diagnose a potential problem, or for any other purpose.

Either the first CPU 1317 or the second CPU 1322 may cause data to be stored in the data/event log portion 1362 of the memory 1314. The second CPU 1322 may, for example, pass along information to the first CPU 1317 via the dual-port RAM 1318 for storage in the memory 1314.

Although the embodiment illustrated in FIG. 13 resembles that of FIG. 11 in that only the first CPU 1317 is shown in direct communication with the plug-in module 1312, alternatively the second CPU 1322 may also directly communicate with the plug-in module 1312, in a manner similar to the embodiment illustrated in FIG. 12, for example. In such an embodiment, the second CPU 1322 may obtain direct access to the unique node identifier and as any functional program code stored in the memory 1314, and may also write data to the data/event log portion 1362 of the memory 1314 as described above. In this embodiment, the memory 1314 may be partitioned, or may physically comprise two separate memory chips, to avoid any potential conflicts between the two CPUs 1317 and 1322 in accessing the information stored in the memory 1314 or writing thereto.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A network node for use in a vehicle control network, comprising:
    a node housing, said node housing comprising an external port;
    a processor contained within said node housing;
    a transceiver contained within said node housing, said transceiver coupled to an external network bus interconnecting multiple nodes of the control network;
    a plurality of input/output ports for controlling or monitoring local electronic vehicle sensors, modules or components;
    a detachable module adapted for connection to said external port; and
    a programmable memory encapsulated within said detachable module, said programmable memory storing a unique node identifier for the network node;
    wherein said programmable memory is accessible to said processor when said detachable module is coupled to said external port;
    wherein the network node communicates over said external network bus using said unique node identifier to identify bus traffic intended for the network node;
    wherein said programmable memory comprises a writable memory portion for storing data obtained from one or more of the local electronic vehicle sensors, modules or components coupled to the network node; and
    wherein said processor is configured to record, in the writable memory portion of said programmable memory, data associated with controlling or monitoring the local electronic vehicle sensors, modules or components.

2. The network node of claim 1, wherein said programmable memory further comprises functional program code for said processor, and wherein said processor is configured to read and execute the functional program code stored in said programmable memory.

3. The network node of claim 1, wherein said transceiver sends and receives messages over said external network bus, and wherein the network node utilizes said unique node identifier for determining which messages received over said external network bus by said transceiver are directed to the network node, and for associating messages sent over said external network bus by said transceiver with the network node.

4. The network node of claim 1, wherein said programmable memory comprises a programmable read-only memory portion.

5. The network node of claim 4, wherein said programmable read-only memory portion is electrically erasable.

6. The network node of claim 1, further comprising a second transceiver for connection to a second external network bus.

7. The network node of claim 1, further comprising a second processor, wherein said programmable memory is accessible to said second processor when said detachable module is connected to said external port.

8. The network node of claim 7 further comprising a second transceiver for connection to a second external network bus, wherein said second transceiver sends and receives messages over said second external network bus, and wherein said second processor utilizes said unique node identifier for determining which messages received over said second external network bus by said second transceiver are directed to the network node, and for associating messages sent over said second external network bus by said second transceiver with the network node.

9. The network node of claim 1, wherein said external port comprises a threaded extension, and wherein said detachable module comprises a threaded attachment piece for securely fastening to the threaded extension of said external port.

10. The network node of claim 1, wherein said processor is configured to store data in the writable memory portion of said programmable memory upon the occurrence of at least one predetermined event.

11. The network node of claim 1, wherein said processor is configured to store selected data periodically in the writable memory portion of said programmable memory at regular timing intervals.

12. A method of connecting a network node in a vehicle control network, comprising the steps of:
    attaching a detachable module to an external port of a node housing of the network node, thereby placing a processor contained within said housing in electrical communication with a programmable memory encapsulated within said detachable module;
    connecting the network node to an external network bus interconnecting multiple nodes of the control network, whereby the network node may communicate with other nodes connected to the external network bus;
    reading a unique node identifier from said programmable memory;
    receiving messages at the network node over said external network bus;
    determining which received messages are intended for the network node by comparing a node identifier contained within a received message with said unique node identifier; and
    writing to the programmable memory, during operation of the network node, data generated from controlling or monitoring local electronic vehicle sensors, modules or components coupled to the network node.

13. The method of claim 12, further comprising the step of sending messages from the network node over the external network bus using said unique node identifier to identify the source of the sent messages.

14. The method of claim 12, further comprising the steps of reading functional program code for said processor from said programmable memory, and executing the functional program code with said processor.

15. The method of claim 12, wherein said programmable memory comprises a programmable read-only memory portion.

16. The method of claim 15, wherein said programmable read-only memory portion is electrically erasable.

17. The method of claim 12, further comprising the steps of connecting the network node to a second external network bus, thereby placing a second processor in electrical communication with said second external data bus.

18. The method of claim 17, further comprising the step of reading said unique node identifier from said programmable memory using said second processor.

19. The method of claim 18, further comprising the step of reading functional program code for said second processor from said programmable memory.

20. The method of claim 19, further comprising the steps of:
receiving additional messages at the network node over said second external network bus; and
determining which of the additional messages received over said second external network bus are intended for the network node by comparing a second node identifier contained within a second received message with said unique node identifier.

21. The method of claim 12, further comprising the step of storing data in the writable memory portion of said programmable memory upon the occurrence of at least one predetermined event.

22. The method of claim 12, further comprising the step of storing selected data periodically in the writable memory portion of said programmable memory at regular timing intervals.

23. The method of claim 12, further comprising the steps of:
removing said detachable module from said external port of the network node, thereby breaking the electrical connection between said processor and said programmable memory encapsulated within said detachable module;
attaching a second detachable module to said external port, thereby making a second electrical connection between said second processor and a second readable memory encapsulated within said second detachable module;
reading a second unique node identifier from said second readable memory;
receiving messages at the network node over said external network bus;
determining which messages are intended for the network node by comparing a node identifiers contained within received messages with said second unique node identifier.

24. A network node for use in a vehicle control network, comprising:
a node housing, said node housing comprising an external port;
a first processor contained within said node housing;
a first transceiver contained within said node housing, said first transceiver having a connection for a first external network bus;
a second processor contained within said node housing;
a second transceiver contained within said node housing, said second transceiver having a connection for a second external network bus;
one or more input/output ports for connection to external local devices deployed in the vehicle;
a detachable module adapted for connection to said external port, said detachable module comprising an enclosed module body; and
a programmable memory encapsulated within said enclosed module body, said programmable memory comprising storing a unique node identifier for the network node;
wherein said programmable memory is accessible to said first processor and to said second processor when said detachable module is connected to said external port; and
wherein said programmable memory comprises a writable portion for storing data generated by monitoring or controlling one or more of said external local devices during operation of the network node.

25. The network node of claim 24, wherein
said first transceiver sends and receives messages over said first external network bus;
said first processor utilizes said unique node identifier for determining which messages received over said first external network bus by said first transceiver are directed to the network node, and for associating messages sent over said first external network bus by said first transceiver with the network node;
said second transceiver sends and receives messages over said second external network bus; and
said second processor utilizes said unique node identifier for determining which messages received over said second external network bus by said second transceiver are directed to the network node, and for associating messages sent over said second external network bus by said second transceiver with the network node.

26. The network node of claim 25, wherein said external port comprises a threaded extension, and wherein said detachable module comprises a threaded attachment piece for securely fastening to the threaded extension of said external port.

27. The network node of claim 1, wherein said detachable module comprises a locking mechanism for secure attachment to the external port, whereby when said detachable module is attached to the external port the electrical connection between the detachable module and the external port is sealed from exposure to the outside.

28. The method of claim 12, wherein said detachable module is attached to the external housing of the network node using a locking mechanism such that the electrical connection between the detachable module and the external port is is sealed from exposure to the outside.

29. The network node of claim 24, wherein said detachable module comprises a locking mechanism for secure attachment to the external port, whereby when said detachable module is attached to the external port the electrical connection between the detachable module and the external port is sealed from exposure to the outside.

30. A network node for use in a vehicle control network, comprising:
a node housing, said node housing comprising an external port;
a processor contained within said node housing;
a transceiver contained within said node housing, said transceiver coupled to an external network bus interconnecting multiple nodes of the control network; and
a detachable module adapted for connection to said external port, said detachable module comprising:
an outer module housing;

a programmable memory encapsulated within said outer module housing, said programmable memory storing a unique node identifier for the network node;

an electronic connector for making electrical contact with a mating connector of said external port and thereby communicatively coupling the programmable memory to the processor; and a locking mechanism adapted to securely attach the detachable module to the external port whereby the connection between the electronic connector and the mating connector is sealed from exposure to the outside;

wherein the network node communicates over said external network bus using said unique node identifier to identify bus traffic intended for the network node.

31. The network node of claim 30, wherein the processor is configured to record data in a writable portion of said programmable memory, said recorded data generated by monitoring or controlling one or more local external devices physically connected to the network node through one or more input/output ports.

32. The network node of claim 31, wherein said processor is configured to store data in the writable memory portion of said programmable memory upon the occurrence of at least one predetermined event.

33. The network node of claim 31, wherein said processor is configured to store selected data periodically in the writable memory portion of said programmable memory at regular timing intervals.

34. The network node of claim 30, wherein said detachable module securably attaches to the external port by use of complementary screw threadings on the detachable module and the external port.

35. A method of connecting a network node in a control network, comprising the steps of:

securely attaching a detachable module to an external port of a node housing of the network node such that the detachable module locks to the external port, thereby placing a processor contained within said housing in electrical communication with a programmable memory encapsulated within said detachable module, whereby the electrical connection between the detachable module and the external port is sealed from exposure to the outside when the detachable module is securely attached to the external port;

connecting the network node to an external network bus interconnecting multiple nodes of the control network, whereby the network node is enabled to communicate with other nodes connected to the external network bus;

reading a unique node identifier from said programmable memory;

receiving messages at the network node over said external network bus; and determining which received messages are intended for the network node by comparing a node identifier contained within a received message with said unique node identifier.

36. The method of claim 35, further comprising the step of recording data in a writable portion of said programmable memory, said data generated by monitoring or controlling one or more local external devices physically connected to the network node through one or more input/output ports.

37. The method of claim 36, wherein said processor is configured to store data in the writable memory portion of said programmable memory upon the occurrence of at least one predetermined event.

38. The method of claim 36, wherein said processor is configured to store selected data periodically in the writable memory portion of said programmable memory at regular timing intervals.

39. The method of claim 35, wherein said detachable module securably attaches to the external port by use of complementary screw threadings on the detachable module and the external port.

* * * * *